US010756980B2

(12) United States Patent
Park et al.

(10) Patent No.: US 10,756,980 B2
(45) Date of Patent: Aug. 25, 2020

(54) ELECTRONIC DEVICE INCLUDING LIGHT EMITTING DEVICE AND OPERATING METHOD THEREOF

(71) Applicant: Samsung Electronics Co., Ltd., Gyeonggi-do (KR)

(72) Inventors: Junhyung Park, Seoul (KR); Nojoon Park, Seongnam-si (KR); Geon-Soo Kim, Suwon-si (KR); Yongjoon Jeon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 15/436,643

(22) Filed: Feb. 17, 2017

(65) Prior Publication Data

US 2017/0245309 A1    Aug. 24, 2017

(30) Foreign Application Priority Data

Feb. 19, 2016    (KR) .......................... 10-2016-0019845

(51) Int. Cl.
*G06F 15/173*    (2006.01)
*H04L 12/24*    (2006.01)
(Continued)

(52) U.S. Cl.
CPC .............. *H04L 41/12* (2013.01); *G08C 23/04* (2013.01); *H04B 10/116* (2013.01); *H04L 12/2809* (2013.01); *H04L 12/2816* (2013.01); *H04L 67/303* (2013.01); *H04W 4/02* (2013.01); *H04W 4/33* (2018.02); *H04W 4/70* (2018.02);
(Continued)

(58) Field of Classification Search
None
See application file for complete search history.

(56) References Cited

U.S. PATENT DOCUMENTS 8,260,261 B2 * 9/2012 Teague .................. H04L 9/3273
455/411
2002/0067715 A1    6/2002 Kotthaus et al.
(Continued)

FOREIGN PATENT DOCUMENTS

CN    102563496 A    7/2012
CN    104093191 A    10/2014
(Continued)

OTHER PUBLICATIONS

International Search Report dated May 29, 2017 in connection with International Patent Application No. PCT/KR2017/001532.
(Continued)

*Primary Examiner* — Phyllis A Book

(57) ABSTRACT

An electronic device includes a wireless communication circuit, a light emitting device, and a control circuit. The wireless communication circuit establishes wireless communication with a first external device. The light emitting device emits light. The control circuit shares information on a location of the electronic device with the first external device. The control circuit also receives a first signal from the first external device via the wireless communication circuit, and, in response to the first signal, the light emitting device emits light according to a selected flashing pattern which indicates at least a part of the location of the electronic device.

20 Claims, 37 Drawing Sheets

(51) Int. Cl.
  *H04W 4/70*   (2018.01)
  *H04W 4/33*   (2018.01)
  *H04L 12/28*  (2006.01)
  *H04W 4/80*   (2018.01)
  *H04B 10/116* (2013.01)
  *H04W 4/02*   (2018.01)
  *H04L 29/08*  (2006.01)
  *H04W 12/00*  (2009.01)
  *G08C 23/04*  (2006.01)
  *H04W 84/18*  (2009.01)

(52) U.S. Cl.
  CPC ........... *H04W 4/80* (2018.02); *H04W 12/003* (2019.01); *H04L 67/12* (2013.01); *H04L 2012/285* (2013.01); *H04L 2012/2841* (2013.01); *H04W 12/00504* (2019.01); *H04W 84/18* (2013.01)

(56) References Cited

U.S. PATENT DOCUMENTS

| | | | |
|---|---|---|---|
| 2004/0120297 A1 | 6/2004 | McDonnell et al. | |
| 2006/0062582 A1* | 3/2006 | Suzuki | H04B 10/502 398/183 |
| 2008/0253202 A1* | 10/2008 | Yu | H04B 10/1143 365/189.09 |
| 2011/0268218 A1* | 11/2011 | Kang | G06F 3/0482 375/295 |
| 2011/0283334 A1* | 11/2011 | Choi | G06F 3/04883 725/148 |
| 2013/0331087 A1 | 12/2013 | Shoemaker et al. | |
| 2014/0208387 A1 | 7/2014 | Ganesh et al. | |
| 2014/0347845 A1 | 11/2014 | Pulido, Jr. | |
| 2015/0130370 A1 | 5/2015 | Tsai et al. | |
| 2015/0195036 A1* | 7/2015 | Park | H04B 10/1149 398/118 |
| 2015/0195365 A1 | 7/2015 | Choi et al. | |
| 2015/0204781 A1 | 7/2015 | Wagner et al. | |
| 2015/0248031 A1 | 7/2015 | Kanbayashi et al. | |
| 2015/0223309 A1 | 8/2015 | Mohan et al. | |
| 2015/0230167 A1 | 8/2015 | Choi et al. | |
| 2015/0327309 A1* | 11/2015 | Gardenfors | H04W 12/08 455/41.2 |
| 2015/0334808 A1 | 11/2015 | Hack et al. | |
| 2015/0347114 A1 | 12/2015 | Yoon | |
| 2015/0359127 A1* | 12/2015 | Daoura | G06Q 10/0833 320/101 |
| 2016/0018646 A1* | 1/2016 | Osterhout | G06T 7/529 345/8 |
| 2016/0037611 A1 | 2/2016 | Min et al. | |

FOREIGN PATENT DOCUMENTS

| | | |
|---|---|---|
| CN | 204437960 U | 7/2015 |
| CN | 104955241 A | 9/2015 |
| JP | 2011244141 A | 12/2011 |
| KR | 20150136981 A | 12/2015 |
| WO | 2010/144651 A2 | 12/2010 |

OTHER PUBLICATIONS

Written Opinion of the International Searching Authority dated May 29, 2017 in connection with International Patent Application No. PCT/KR2017/001532.

Supplementary European Search Report dated Apr. 25, 2019 in connection with European Patent Application No. 17 75 3427, 14 pages.

Supplementary Partial European Search Report dated Feb. 7, 2019 in connection with European Patent Application No. 17 75 3427, 14 pages.

Office Action dated Oct. 31, 2019 in connection with European Patent Application No. 17 753 427.8, 7 pages.

Office Action dated Sep. 12, 2019 in connection with Chinese Patent Application No. 2017800121169, 21 pages.

Notification of the Second Office Action in connection with Chinese Application No. 201780012116.9 dated Jun. 22, 2020, 8 pages.

* cited by examiner

ELECTRONIC DEVICE INCLUDING LIGHT EMITTING DEVICE AND OPERATING METHOD THEREOF

CROSS-REFERENCE TO RELATED APPLICATION(S) AND CLAIM OF PRIORITY

The present application is related to and claims the priority under 35 U.S.C. § 119(a) to Korean Application Serial No. 10-2016-0019845, which was filed in the Korean Intellectual Property Office on Feb. 19, 2016, the entire content of which is hereby incorporated by reference.

TECHNICAL FIELD

The present disclosure relates to an electronic device, and more particularly, to an electronic device including a light emitting device.

BACKGROUND

The Internet enabled many computing devices, such as servers, personal computers, and mobile devices, to connect with one another, and to exchange information with one another. In recent years, attempts to connect things having no normal computing function, for example, sensors, home appliances, and meters, as well as the related-art computing devices, to the Internet and exchange a variety of information or data are ongoing. Such a mechanism for connecting things to the Internet is normally called "Internet of Things (IoT)."

In order to realize the IoT, many researches and development are being conducted on establishment of a protocol for communications among various kinds of IoT devices, communications among different devices, and collection of data. The IoT is combined with various related-art technical fields and is expected to contribute to the advancement of technology through the Internet.

SUMMARY

In order to connect an IoT device to the Internet to implement the IoT, a process of registering the IoT device at a hub device connected to the Internet may be required first.

In this case, when there are a plurality of IoT devices to be registered, the process of registering the IoT device at the Internet should be repeatedly performed as many times as the number of IoT devices.

Accordingly, due to the repeated processes of registering the IoT devices, users may lack experience in using the IoT devices.

To address the above-discussed deficiencies, it is a primary object to provide an exemplary embodiment of the present disclosure may provide an electronic device. The electronic device may include: a wireless communication circuit set to establish wireless communication with a first external device; a light emitting device set to emit light; and a control circuit electrically connected with the wireless communication circuit and the light emitting device, and set to share information on a location of the electronic device with the first external device, and the control circuit may be set to receive a first signal from the first external device via the wireless communication circuit, and, in response to the first signal, the light emitting device may be set to emit light according to a selected flashing pattern which indicates at least a part of the location of the electronic device.

Another exemplary embodiment of the present disclosure may provide a first external device. The first external device may include: a wireless communication circuit set to communicate with an electronic device and a second external device; and a control circuit electrically connected with the wireless communication circuit and set to register the second external device. The control circuit may be set to: select a flashing pattern of the electronic device emitting light toward the second external device; transmit a first signal including information on the selected flashing pattern to the electronic device; when the electronic device emits light according to the flashing pattern in response to the first signal, receive response information on the flashing pattern from the second external device via the wireless communication circuit; and, based on the received flashing pattern, register the second external device.

Still another exemplary embodiment of the present disclosure may provide an operating method of an electronic device which includes a light emitting device. The operating method may include: establishing wireless communication with a first external device; when the wireless communication is established, receiving a first signal from the first external device; and, in response to the received first signal, emitting light using the light emitting device according to a selected flashing pattern indicating at least a part of a location of the electronic device.

Yet another exemplary embodiment of the present disclosure may provide a method for registering, by a first external device, a second external device. The method may include: selecting a flashing pattern of an electronic device to emit light toward the second external device; transmitting a first signal including information on the selected flashing pattern to the electronic device; when the electronic device emits light according to the flashing pattern in response to the first signal, receiving response information on the flashing pattern from the second external device; and registering the second external device based on the received flashing pattern.

Further exemplary embodiment of the present disclosure may provide one or more computer readable recording media which store a program for an operating method of an electronic device including a light emitting device. The operating method may include: establishing wireless communication with a first external device; when the wireless communication is established, receiving a first signal from the first external device; and, in response to the received first signal, emitting light using the light emitting device according to a selected flashing pattern indicating at least a part of a location of the electronic device.

Still further exemplary embodiment of the present disclosure may provide one or more computer readable recording media which store a program for a method for registering, by a first external device, a second external device. The method may include: selecting a flashing pattern of an electronic device to emit light toward the second external device; transmitting a first signal including information on the selected flashing pattern to the electronic device; when the electronic device emits light according to the flashing pattern in response to the first signal, receiving response information on the flashing pattern from the second external device; and registering the second external device based on the received flashing pattern.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
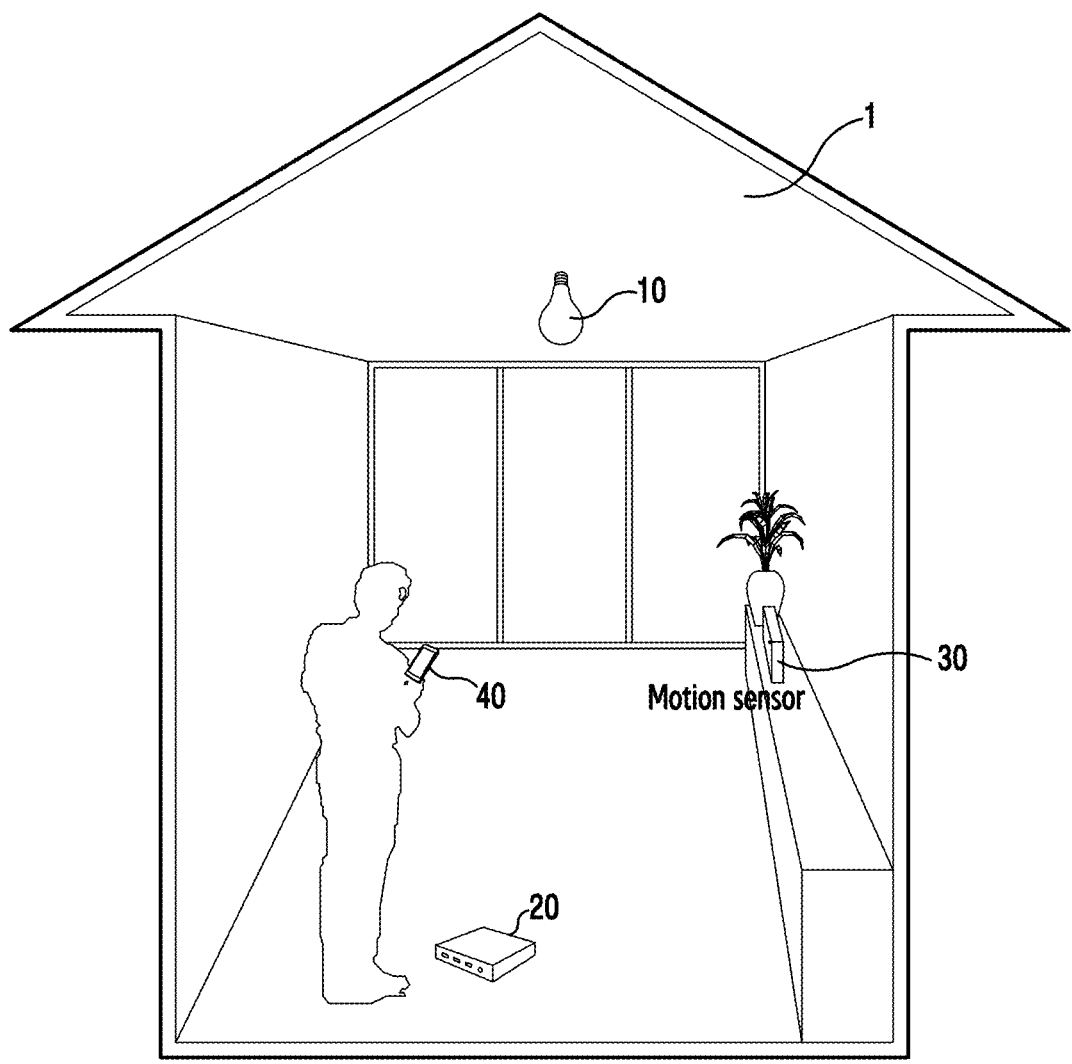
FIGS. 1A to 1D illustrate views showing systems in which an electronic device registers IoT devices via a hub device according to various exemplary embodiments.

FIGS. 1A through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be described with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor may cause the one or more processors to execute the function corresponding to the instruction. The computer-readable storage medium may be, for example, the memory.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The embodiments disclosed herein are provided merely to easily describe technical details of the present disclosure and to help the understanding of the present disclosure, and are not intended to limit the scope of various embodiments of the present disclosure. Therefore, it should be construed that all modifications and changes or various other embodiments based on the technical idea of various embodiments of the present disclosure fall within the scope of various embodiments of the present disclosure.

Figure 1B:
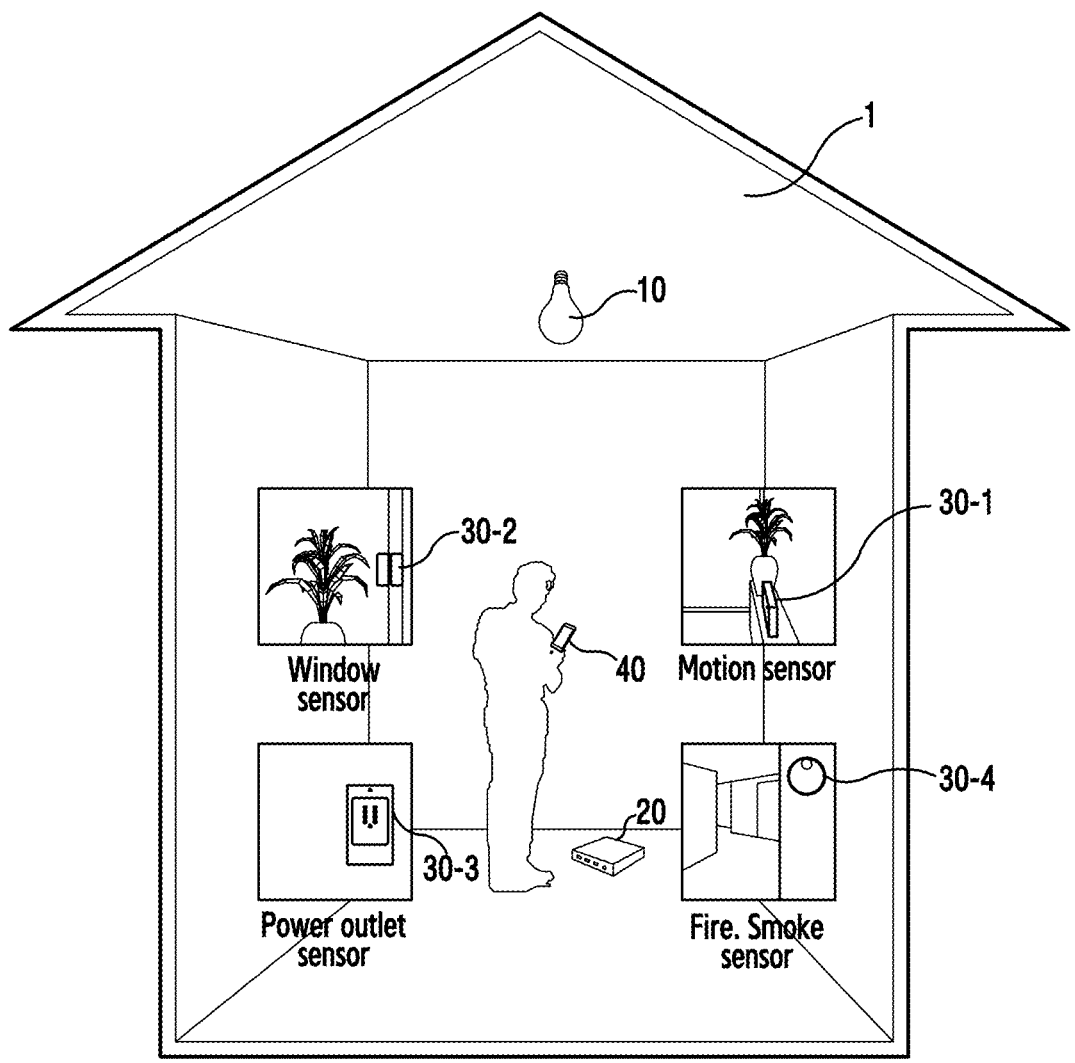
Figure 1C:
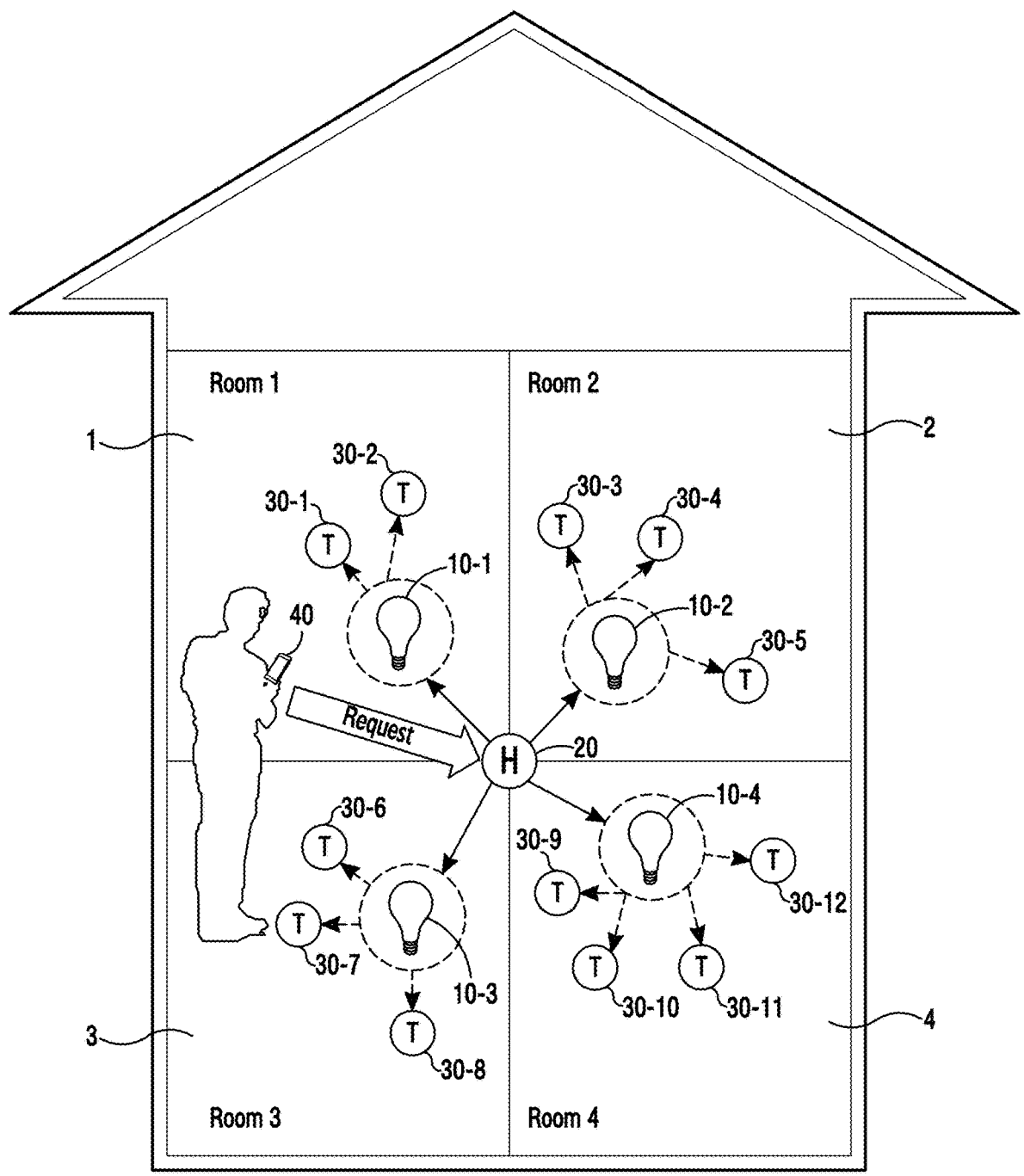

FIGS. 1A to 1C illustrate views showing systems in which an electronic device registers IoT devices via a hub device according to various exemplary embodiments.

In FIGS. 1A to 1C, the electronic device may be a smart lamp 10.

In FIG. 1A, the system may include a smart lamp 10, a hub device 20, an IoT device 30, and a user device 40. The IoT device 30 may be provided in the same location 1 (or place) as the location 1 (or place) where the smart lamp 10 is provided in order to sense illuminance caused by light emitted by the smart lamp 10.

The smart lamp 10 may include a light emitting device for emitting light and may perform a function of communicating with an external device in a wired or wireless manner.

The hub device 20 may communicate with external devices (for example, the smart lamp 10, the IoT device 30, the user device 40, a server, or another hub device (not shown)), and may control the external devices or may perform a controlled function of being controlled by the external devices. In addition, the hub device 20 may perform a function of collecting data from the IoT device 30 and transmitting the collected data to another external device. For example, the hub device 20 may be a home networking controller, a set-top box, a media device (for example, Samsung HOMESYNC™, GOOGLE TV®, APPLE TV®), a game console (for example, MICROSOFT XBOX®, SONY PLAYSTATION®), a network access point, a security control panel, a home climate controller, or a gateway. For example, the hub device 20 may be an electronic device (for example, the user device 40) having a function of a hub device (for example, software) mounted therein.

The IoT device 30 may sense an ambient environment of the IoT device 30, and may transmit the sensed data (for example, a sensing value or sensing information based on the sensing value) to an external device (for example, the hub device 20, the user device 40, the server (not shown), or another IoT device (not shown)), or may operate according to a control command of the external device. For example, the IoT device 30 may include at least one of various sensors (for example, a motion sensor, a window open/close sensor, a smoke sensor, a power outlet sensor, or the like), a gas meter, a sprinkler, a fire alarm, a thermostat, a streetlamp, exercise equipment, a hot water tank, a heater, a boiler, a home appliance (for example, a TV, a refrigerator, an oven, a washing machine, a drying machine, or the like), a smart lamp, a voltameter, a gas meter, a solar power system, a sprinkler system, a thermostat system, a car, a wearable device, a closed circuit television (CCTV), a writing instrument, a keyboard, a mouse, a charger, furniture (for example, a bed, a mirror), a door lock, or a security system. The wearable device may include at least one of an accessory type device (for example, a watch, a ring, a bracelet, an ankle bracelet, a necklace, glasses, a contact lens, or a head-mounted device (HMD)) or a fabric or clothing integrated type device (for example, electronic clothing). For example, the IoT device 30 may include an electronic device (for example, the user device 40) having a function (for example, software) mounted therein for connecting to an IoT system.

The user device 40 may communicate with the hub device 20 and acquire data which is collected by the hub device 20 through the IoT device 30. In addition, the user device 40 may transmit a command to control the IoT device 30 to the hub device 20.

According to another exemplary embodiment, the user device 40 may directly communicate with the IoT device 30. In this case, the user device 40 may directly acquire data from the IoT device 30 or may directly transmit a command to control the IoT device 30 to the IoT device 30.

According to various exemplary embodiments of the present disclosure, the user device 40 may include, for example, at least one of a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, a wearable device, electronic clothing, an electronic bracelet, an electronic necklace, an appcessory, electronic tattoos, a smart mirror, or a smart watch.

In addition, in the present disclosure, the term "user" may refer to a person who uses at least one of the smart lamp 10, the hub device 20, the IoT device 30, or the user device 40, or a device using these devices (for example, an artificial intelligence electronic device).

According to an exemplary embodiment, the smart lamp 10 in FIG. 1A may establish wireless communication with the hub device 20. For example, the establishing the wireless communication may refer to connecting the smart lamp 10 and the hub device 20 with each other or pairing the smart lamp 10 and the hub device 20 with each other. In addition, the establishing the wireless communication may refer to forming a channel to transmit/receive data between the smart lamp 10 and the hub device 20.

When the wireless communication is established, the hub device 20 may transmit a first signal to the smart lamp 10 in order to register the IoT device 30 placed in the same location as that of the smart lamp 10. For example, the first signal may be a signal which includes information on a flashing pattern of the smart lamp 10 when the smart lamp 10 emits light.

When the wireless communication is established, the smart lamp 10 may receive the first signal from the hub device 20.

When the first signal is received, the smart lamp 10 may emit light using a light emitting device according to a selected flashing pattern in response to the received first signal. The selected flashing pattern may indicate at least a part of the location 1 of the smart lamp 10. In this case, the location 1 (or place) where the smart lamp 10 is placed may be determined according to the flashing pattern of the smart lamp 10. For example, the location 1 where the smart lamp 10 is placed may be determined according to at least one of the number of times the smart lamp 10 flashes, a flashing frequency, a color of flashing light, and brightness of flashing light.

When the smart lamp 10 emits light according to the selected flashing pattern, the IoT device 30 may sense the illuminance in the location 1 of the smart lamp 10. In addition, based on illuminance data, the IoT device 30 may transmit information for wirelessly connecting to the hub device 20 to the smart lamp 10. For example, the information may include response information on the flashing pattern of the light emitted by the smart lamp 10.

The smart lamp 10 may forward the information received from the IoT device 30 to the hub device 20. According to another exemplary embodiment, the IoT device 30 may directly transmit the information to the IoT device 30.

The hub device 20 which receives the information may register the IoT device 30 at the hub device 20. When the IoT device 30 is registered, the hub device 20 may transmit the result of the registration of the IoT device 30 to the user device 40. The result of the registration may include identification information and location information of the registered IoT device 30. The location information of the IoT device 30 may be the same information as that of the smart lamp 10, for example.

In FIG. 1B, the system may include a smart lamp 10, a hub device 20, a plurality of IoT devices 30-1 to 30-4, and a user device 40.

In this case, each of the plurality of IoT devices 30-1 to 30-4 may be one example of the IoT device 30 of FIG. 1A.

In FIG. 1B, the plurality of IoT devices 30-1 to 30-4 may include a motion sensor 30-1, a window open/close sensor 30-2, a power outlet sensor 30-3, and a smoke sensor 30-4.

In FIG. 1B, each of the plurality of IoT devices 30-1 to 30-4 may be provided in the same location 1 as the location 1 where the smart lamp 10 is provided.

According to an exemplary embodiment, the smart lamp 10 in FIG. 1B may establish communication with the hub device 20.

When wireless communication is established, the smart lamp 10 may receive a first signal from the hub device 20. For example, the first signal may be a signal which includes information on a flashing pattern of the smart lamp 10 to emit light.

When the smart lamp 10 emits light according to a selected flashing pattern, each of the plurality of IoT devices 30-1 to 30-4 may sense illuminance in the location 1 where the smart lamp 10 is provided.

In addition, based on illuminance data, each of the plurality of IoT devices 30-1 to 30-4 may transmit information for wirelessly connecting to the hub device 20 to the smart lamp 10.

The smart lamp 10 may forward the information received from each of the plurality of IoT devices 30-1 to 30-4 to the hub device 20. According to another exemplary embodiment, each of the plurality of IoT devices 30-1 to 30-4 may directly transmit the information to the hub device 20.

The hub device 20 which receives the information may register the plurality of IoT devices 30-1 to 30-4 at the hub device 20. When the plurality of hub devices 30-1 to 30-4 are registered, the hub device 20 may transmit the result of the registration of the plurality of hub devices 30-1 to 30-4 to the user device 40.

In FIG. 1C, the system may include a plurality of smart lamps 10-1, 10-2, 10-3, and 10-4, a hub device 20, a plurality of IoT devices 30-1 to 30-12, and a user device 40.

In this case, each of the plurality of smart lamps 10-1, 10-2, 10-3, and 10-4 may be one example of the smart lamp 10 of FIG. 1A, and each of the plurality of IoT devices 30-1 to 30-12 may be one example of the IoT device 30 of FIG. 1A.

In FIG. 1C, each of the plurality of IoT devices 30-1 to 30-12 may be provided in the same location as the location of one smart lamp 10-1, 10-2, 10-3, or 10-4 of the smart lamps 10-1, 10-2, 10-3, and 10-4. For example, the plurality of IoT devices 30-1 and 30-2 may be provided in the same location as the location 1 of the first smart lamp 10-1, the plurality of IoT devices 30-3 to 30-5 may be provided in the same location as the location 2 of the second smart lamp 10-2, the plurality of IoT devices 30-6 to 30-8 may be provided in the same location as the location 3 of the third smart lamp 10-3, and the plurality of IoT devices 30-9 to 30-12 may be provided in the same location as the location 4 of the fourth smart lamp 10-4.

According to an exemplary embodiment, the plurality of smart lamps 10-1 to 10-4 in FIG. 1C may establish communication with the hub device 20.

When wireless communication is established, the plurality of smart lamps 10-1 to 10-4 may receive a first signal from the hub device 20. For example, the first signal may be a signal which includes information on a flashing pattern of each of the plurality of smart lamps 10-1 to 10-4 to emit light. The first signal may be transmitted to the plurality of smart lamps 10-1 to 10-4 in sequence, for example. In this case, the information on the flashing patterns to be transmitted to the plurality of smart lamps 10-1 to 10-4 may be different from one another. In other words, information on different flashing patterns may be transmitted to the plurality of smart lamps 10-1 to 10-4 to distinguish the locations of the plurality of smart lamps 10-1 to 10-4 from one another.

A smart lamp that receives the first signal from among the plurality of smart lamps 10-1 to 10-4 may emit light according to a selected flashing pattern through a light emitting device. The selected flashing pattern may indicate at least a part of the location of the smart lamp that receives the first signal (at least one of the smart lamp 10-1, 10-2, 10-3, or 10-4).

When the smart lamp (at least one of the smart lamp 10-1, 10-2, 10-3, or 10-4) emits light according to the selected flashing pattern, the plurality of IoT devices 30-1 to 30-12 may sense illuminance in the locations of the plurality of smart lamps 10-1 to 10-4. For example, the plurality of IoT devices 30-1 and 30-2 may sense illuminance in the location 1 of the first smart lamp 10-1, the plurality of IoT devices 30-3 to 30-5 may sense illuminance in the location 2 of the second smart lamp 10-2, the plurality of IoT devices 30-6 to 30-8 may sense illuminance in the location 3 of the third smart lamp 10-3, and the plurality of IoT devices 30-9 to 30-12 may sense illuminance in the location 4 of the fourth smart lamp 10-4.

In addition, based on illuminance data, the plurality of IoT devices 30-1 to 30-12 may transmit information for wirelessly connecting to the hub device 20 to the smart lamps provided in the respective locations of the plurality of IoT devices 30-1 to 30-12. For example, the plurality of IoT devices 30-1 and 30-2 may transmit the information to the first smart lamp 10-1, the plurality of IoT devices 30-3 to 30-5 may transmit the information to the second smart lamp 10-2, the plurality of IoT devices 30-6 to 30-8 may transmit the information to the third smart lamp 10-3, and the plurality of IoT devices 30-9 to 30-12 may transmit the information to the fourth smart lamp 10-4.

The plurality of smart lamps 10-1 to 10-4 may forward the information for wirelessly connecting the plurality of IoT devices 30-1 to 30-12 to the hub device 20 to the hub device 20. According to another exemplary embodiment, the plurality of IoT devices 30-1 to 30-12 may directly transmit the information to the hub device 20.

The hub device 20 which receives the information may register the plurality of IoT devices 30-1 to 30-12 at the hub device 20. When the plurality of IoT devices 30-1 to 30-12 are registered, the hub device 20 may transmit the result of the registration of the plurality of IoT devices 30-1 to 30-12 to the user device 40.

Figure 1D:
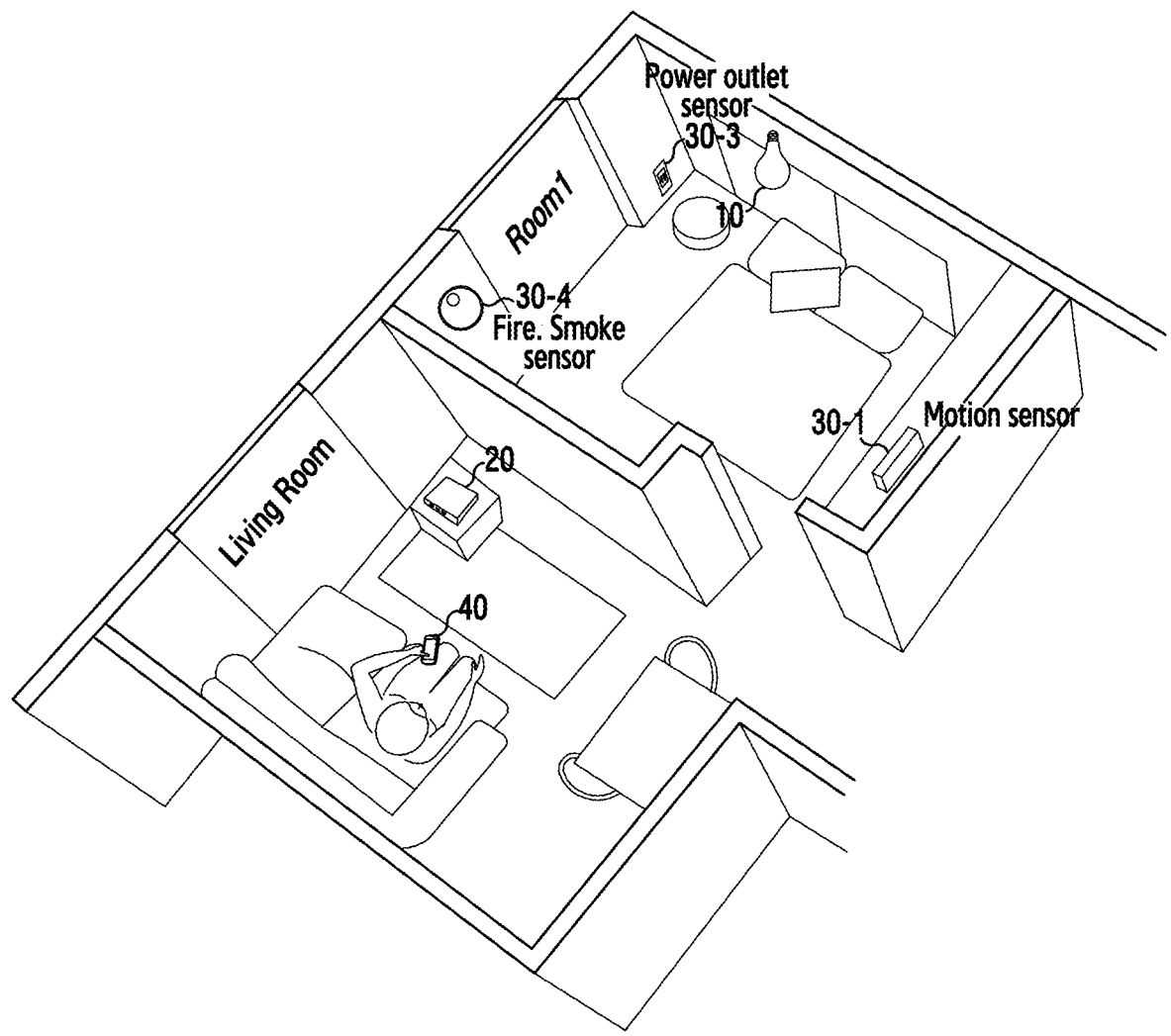

In FIG. 1D, the system may include a smart lamp 10, a hub device 20, a plurality of IoT devices 30-1, 30-3, 30-4, and a user device 40.

In this case, each of the plurality of IoT devices 30-1 to 30-4 may be one example of the IoT device 30 of FIG. 1A.

For example, the plurality of IoT devices 30-1 to 30-4 in FIG. 1D may include a motion sensor 30-1, a power outlet sensor 30-3, and a smoke sensor 30-4.

In FIG. 1D, the plurality of IoT devices 30-1 to 30-4 may be provided in the same location (for example, room 1) as the location (for example, room 1) where the smart lamp 10 is provided.

According to an exemplary embodiment, the smart lamp 10 in FIG. 1D may emit light according to a flashing pattern in order to register the plurality of IoT devices 30-1 to 30-4. The plurality of IoT devices 30-1 to 30-4 may sense illuminance in the location (for example, room 1) where the smart lamp 10 is provided. The plurality of IoT devices 30-1 to 30-3 may transmit information for wirelessly connecting to the hub device 20 to the hub device 20 via the smart lamp 10, or may directly transmit the information to the hub device 20.

The hub device 20 may register the plurality of IoT devices 30-1 to 30-2 at the hub device 20 based on the information. The hub device 20 may transmit the result of the registration of the plurality of IoT devices 30-1 to 30-3 to the user device 40 which is placed in a different space (for example, a living room) from that of the plurality of IoT devices 30-1 to 30-3.

Figure 2:
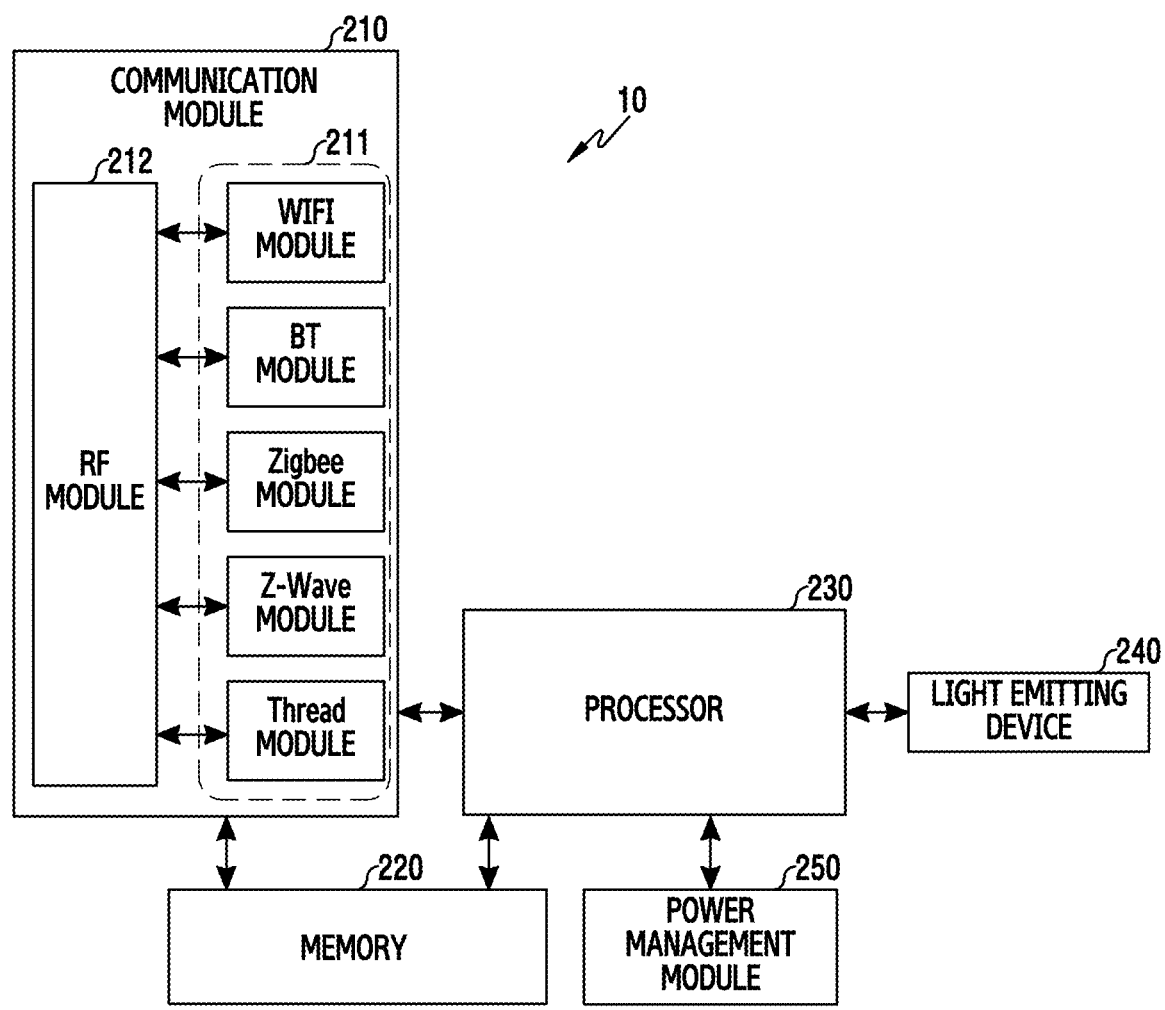
FIG. 2 illustrates a view showing a structure of a smart lamp according to various exemplary embodiments of the present disclosure.

FIG. 2 illustrates a view showing a structure of a smart lamp 10 according to various exemplary embodiments of the present disclosure.

Referring to FIG. 2, the smart lamp 10 may include a communication module (or a wireless communication circuit) 210, a light emitting device 240, a power management module 250, a memory 220, and a processor (or a control circuit, a processing circuit) 230.

The communication module 210 may include a radio frequency (RF) module 212 for transmitting and receiving an RF signal, and may include at least one of short-distance communication modules 211 such as a wireless fidelity (Wi-Fi) module, a Bluetooth (BT) module, a Zigbee module, a Z-Wave module, a Thread module, or the like. In FIG. 2, the short-distance communication modules 211 share the single RF module 212, but, according to an exemplary embodiment, at least one of the short-distance communication modules 211 may transmit and receive the RF signal via a separate RF module. In addition, the communication module 210 may include at least one of long-distance communication modules such as a long term evolution (LTE) module, an LTE-Advanced (A) module, a code division multiple access (CDMA) module, a wide-CDMA (WCDMA) module, a universal mobile telecommunication system (UMTS) module, a wireless broadband (WiBro) module, or a global system for mobile communication (GSM) module, or the like. The communication module 210 may communicate with at least one of a hub device 20 and an IoT device 30.

The light emitting device 240 may emit light. The light emitting device 240 may be various devices or an organic matter which emits light, such as a light emitting diode (LED), a laser diode, an incandescent lamp, a fluorescent lamp, or a light emitting organic matter. In addition, the light emitting device is not limited to the above-described embodiment and may include a new device or new organic matter according to the development of technology.

The light emitting device 240 may emit light substantially in all directions. Herein, the emitting the light substantially in all directions may refer to light being emitted toward an unspecified point in a plurality of directions, rather than light being emitted toward a specified point like a pointer. In this case, the direction in which light is emitted may be a spherical direction which is formed with reference to the light emitting device 240, or may be a vertical or horizontal direction according to the shape of a light transmission unit provided in the light emitting device.

The power management module 250 may control power for driving the smart lamp 10. The power management module 250 may continuously supply external power supplied from a power generator to the smart lamp 10, or may supply power supplied from a battery to the smart lamp 10. In addition, the power management module 250 may include a hardware module or a software module, separately, to operate the smart lamp 10 at low power.

The memory 220 may include an internal memory or an external memory.

For example, the internal memory may include at least one of a volatile memory (for example, a dynamic random access memory (DRAM), a static RAM (SRMA), a synchronous dynamic RAM (SDRAM), or the like), or a nonvolatile memory (for example, a one time programmable read only memory (OTPROM), a programmable ROM (PROM), an erasable and programmable ROM (EPROM), an electrically erasable and programmable ROM (EEPROM), a mask ROM, a flash ROM, a NAND flash memory, a NOR flash memory, or the like). According to an exemplary embodiment, the internal memory may be a solid state drive (SSD).

The external memory may include a flash drive, for example, a compact flash (CF), a secure digital (SD), a micro-SD, a mini-SD, an extreme digital (xD), a memory stick, or the like. The external memory may be functionally connected with the smart lamp 10 via various interfaces. According to an exemplary embodiment, the smart lamp 10 may further include a storage device (or a storage medium) such as a hard drive.

The memory 220 may store information on a pattern and/or a frequency of the smart lamp 10 to emit light.

In addition, the memory 220 may include identification information of the smart lamp 10 (for example, a MAC address, a name, a byname, a network ID, or the like), and identification information of the hub device 20 connected with the smart lamp 10 (for example, a MAC address, a name, a byname, a network ID, or the like).

The processor 230 (or the control circuit) may perform an overall operation of the smart lamp 10. The processor 230 may be electrically connected with the communication module 210 and the light emitting device 240 and may share information on the location of the smart lamp 10 with the hub device 20.

For example, when communication is established between the hub device 20 and the smart lamp 10 using the communication module 210, the processor 230 may receive a first signal from the hub device 20 via the communication module 210. In this case, the first signal may include information on a flashing pattern of light to be emitted by the smart lamp 10.

Next, in response to the received first signal, the processor 230 may control the light emitting device 240 to emit light according to a selected flashing pattern indicating at least a part of the location of the smart lamp 10. The flashing pattern may be determined according to at least one of the number of times the light emitting device 240 emits light during a predetermined time, a flashing frequency, a color of flashing light, and brightness of flashing light.

After the light emitting device 240 emits light, the processor 230 may receive a second signal from the IoT device 30 which senses illuminance of the emitted light. In this case, the second signal may include information for wirelessly connecting the IoT device 30 to the hub device 20. For example, the second signal may include response information on the flashing pattern based on illuminance sensed by the IoT device 30 and relevant illuminance data.

Figure 3:
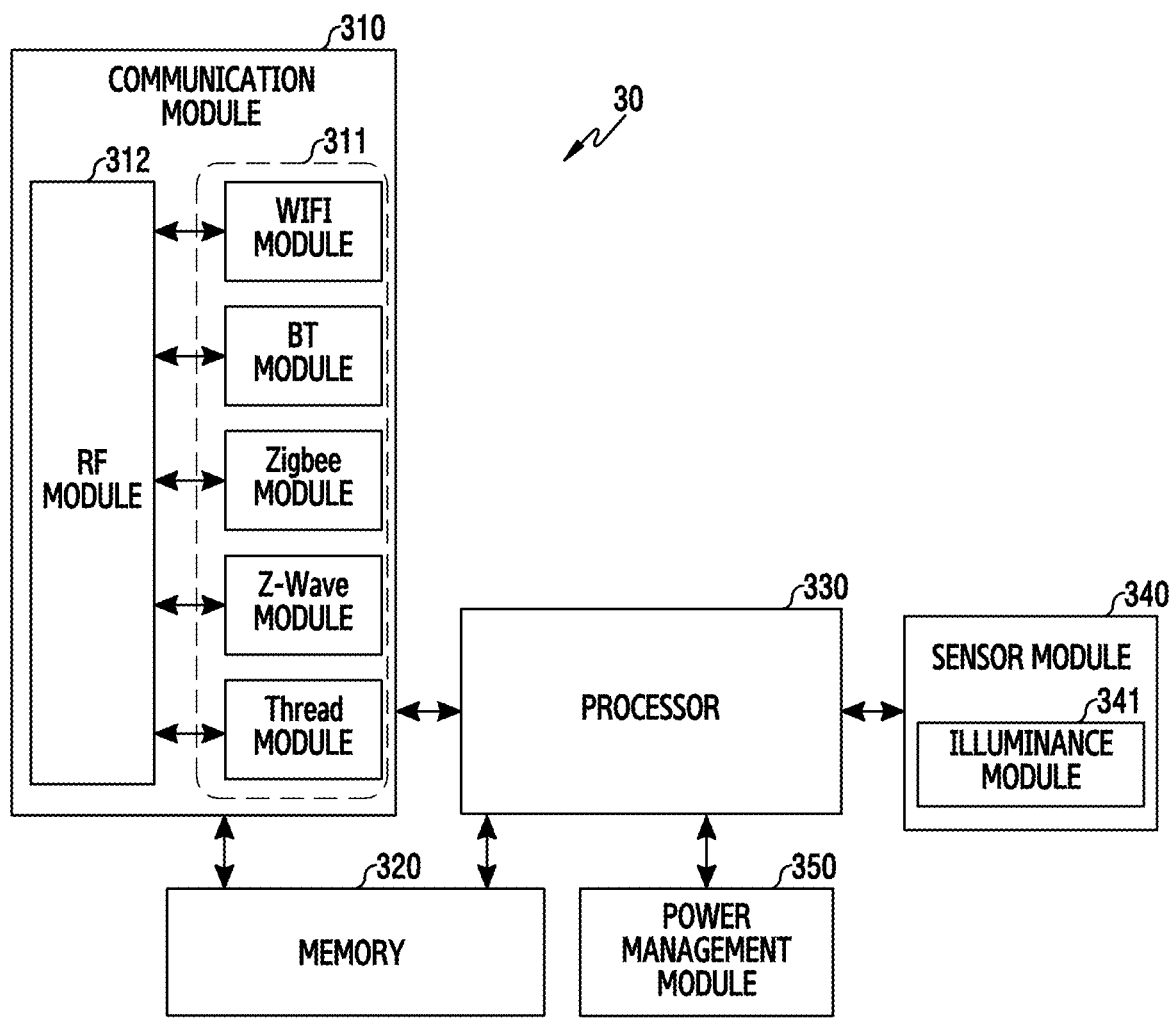
FIG. 3 illustrates a view showing a structure of an IoT device according to various exemplary embodiments of the present disclosure.

FIG. 3 is a view showing a structure of an IoT device 30 according to various exemplary embodiments of the present disclosure.

Referring to FIG. 3, the IoT device 30 may include a communication module (or a communication circuit) 310, a sensor module 340, a power management module 350, a memory 320, and a processor (or a control circuit, processing circuit) 330.

The communication module 310 may include an RF module 312 for transmitting and receiving an RF signal and at least one of short-distance communication modules 311. In addition, the communication module 310 may further include a long-distance communication module.

Examples of the short-distance communication module 311 and the long-distance communication module will not be described in detail by dealing with the examples of the short-distance communication module 211 and the long-distance communication module of the smart lamp 10 of FIG. 2. The communication module 311 may communicate with at least one of the hub device 20 and the smart lamp 10.

The sensor module 340 may include an illuminance sensor 341 to sense illuminance of light emitted by the smart lamp 10. In addition, the sensor module 340 may include various sensors to sense a physical quantity of surroundings or sense an operation state of the IoT device 30. For example, the sensor module 340 may include at least one of a motion sensor, a gesture sensor, a gyro sensor, a barometric pressure sensor, a magnetic sensor, an acceleration sensor, a grip sensor, a proximity sensor, a color sensor (for example, a red, green, blue (RGB) sensor), a biometric sensor, a temperature/humidity sensor, an illuminance sensor, or a ultraviolet (UV) sensor.

Additionally or alternatively, the sensor module 340 may include an E-nose sensor, an electromyography (EMG) sensor, an electroencephalogram (EEG) sensor, an electrocardiogram (ECG) sensor, an infrared (IR) sensor, a ultrasonic sensor, an iris sensor, or a fingerprint sensor. The sensor module 340 may further include a control circuit to control one or more sensors provided therein.

The power management module 350 may control power for driving the IoT device 30. The power management module 350 may continuously supply external power supplied from a power generator to the IoT device 30, or may supply power supplied from a battery to the IoT device 30.

The memory 320 may include an internal memory or an external memory. Examples of the memory 320 will not be described in detail by dealing with the examples of the memory 220 of the smart lamp 10 of FIG. 2.

The memory 320 may include identification information of the IoT device 30 (for example, a MAC address, a name, a byname, a network ID, or the like) and identification information of the hub device 20 connected with the IoT device 30 (for example, a MAC address, a name, a byname, a network ID, or the like). In addition, the memory 320 may include logic for extracting a flashing pattern from illuminance data related to the sensed illuminance. The logic for extracting the flashing pattern may be updated periodically or when necessary. In addition, the memory 320 may store a registration flag for registering the IoT device 30. In addition, the memory 320 may include an area for storing the flashing pattern. In addition, the memory 320 may store a threshold value for measuring a range of a change in illuminance. In this case, the threshold value may be updated periodically or when necessary.

The processor (or the control circuit) 330 may perform an overall operation of the IoT device 30.

For example, the processor 330 may analyze illuminance data related to illuminance received via the illuminance sensor 341. In addition, the processor 330 may verify a light emitting pattern of the smart lamp 10 based on the analyzed illuminance data. According to the result of the verification, the processor 330 may transmit response information on the flashing pattern to the hub device 20 or the smart lamp 10.

When registration information accompanied by the registration of the IoT device 30 is received from the hub device 20 in response to the response information on the flashing pattern, the IoT device 30 may be registered at the hub device 20. Accordingly, a communication connection may be established between the IoT device 30 and the hub device 20.

Figure 4:
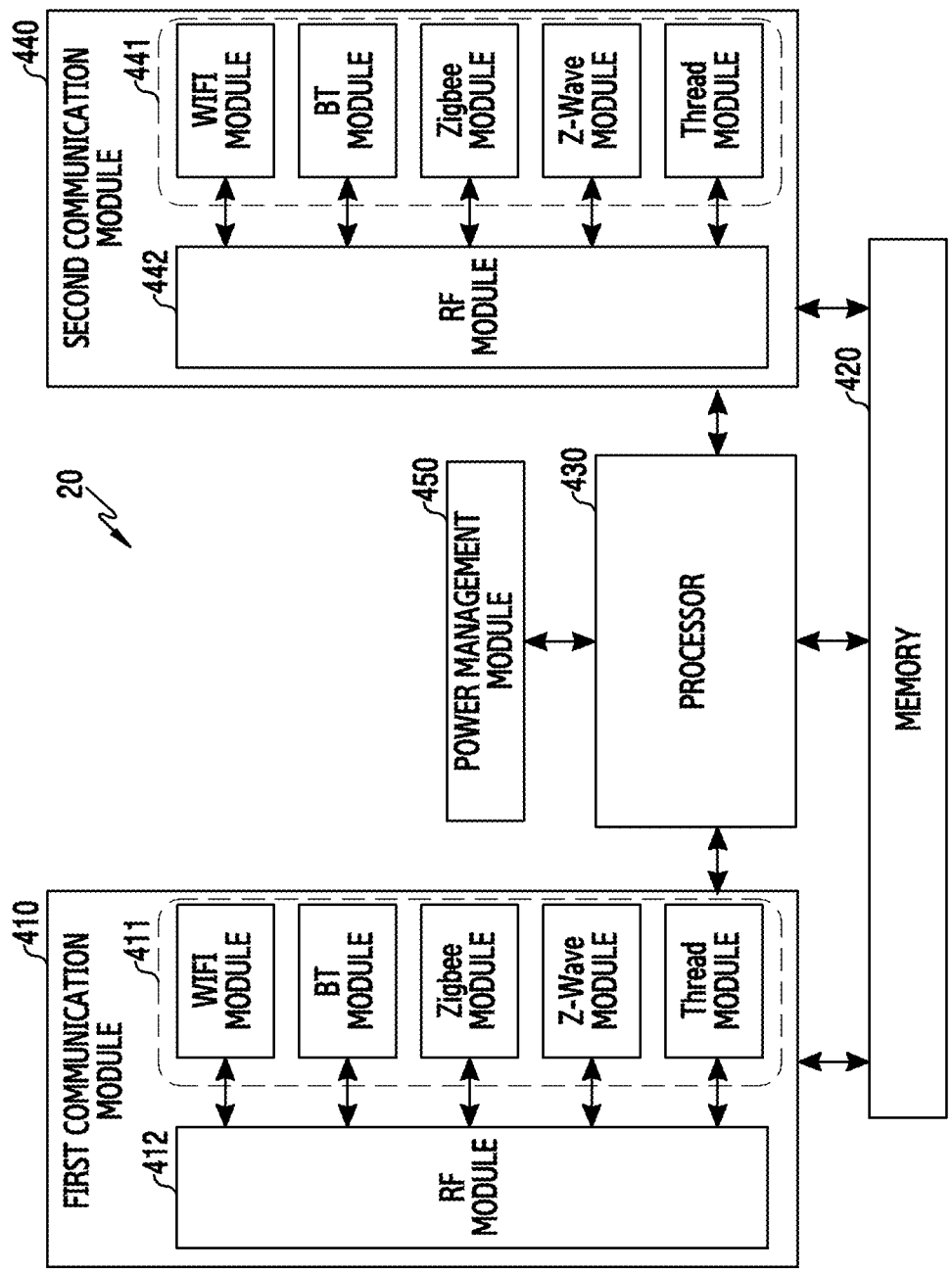
FIG. 4 illustrates a view showing a structure of a hub device according to various exemplary embodiments of the present disclosure.

FIG. 4 illustrates a view showing a structure of a hub device 20 according to various exemplary embodiments of the present disclosure.

Referring to FIG. 4, the hub device 20 may include a first communication module (or a first wireless communication circuit) 410, a second communication module (or a second wireless communication circuit) 440, a power management module 450, a memory 420, and a processor (or a control circuit, processing circuit) 430.

Each of the first communication module 410 and the second communication module 440 may include an RF module 412, 442 for transmitting and receiving an RF signal, and a short-distance communication module 411, 441. In addition, each of the first communication module 410 and the second communication module 440 may further include a long-distance communication module.

Examples of the short-distance communication module 411, 441 and the long-distance communication module will not be described in detail by dealing with the examples of the short-distance communication module 211 and the long-distance communication module of the smart lamp 10 of FIG. 2.

The first communication module 410 may communicate with the smart lamp 10 and the IoT device 30, and the second communication module 440 may communicate with the user device 40. According to another exemplary embodiment, one of the first communication module 410 and the second communication module 440 may communicate with all of the smart lamp 10, the IoT device 30, and the user device 40.

The power management module 450 may control power for driving the hub device 20. The power management module 450 may continuously supply external power supplied from a power generator to the hub device 20, or may supply power supplied from a battery to the hub device 20.

The memory 420 may include an internal memory or an external memory. Examples of the memory 420 will not be described in detail by dealing with the examples of the memory 220 of the smart lamp 10 of FIG. 2.

The processor (or the control circuit) 430 may perform an overall operation of the hub device 20.

For example, the processor 430 may select a flashing pattern of the smart lamp 10. When the processor 430 selects a plurality of flashing patterns corresponding to a plurality of smart lamps 10, the plurality of flashing patterns may be different from one another.

The processor 430 may transmit a first signal including information on the flashing pattern to the smart lamp 10.

When the smart lamp 10 which receives the first signal emits light according to the flashing pattern, the processor 430 may receive response information on the flashing pattern from the IoT device 30 or the smart lamp 10 via the first communication module 410.

In addition, the processor 430 may register the IoT device 30 which has transmitted the response information based on the received flashing pattern. For example, when the flashing pattern included in the response information is consistent with or similar to the flashing pattern transmitted to the smart lamp 10, the processor 430 may register the IoT device 30 which has transmitted the response information.

As a result of registering the IoT device 30, a communication connection may be established between the hub device 20 and the IoT device 30.

Figure 5A:
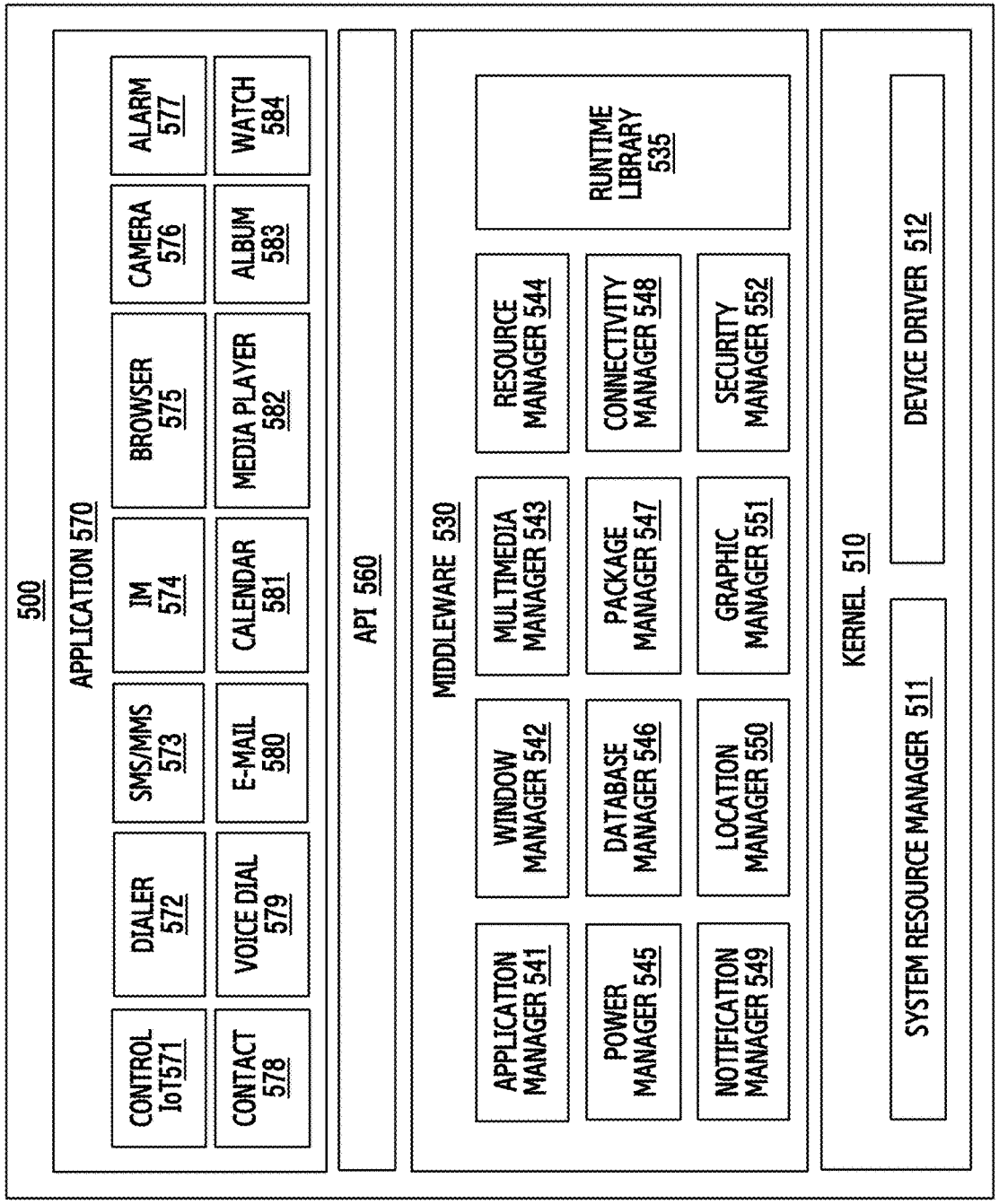
FIGS. 5A and 5B illustrate views showing a structure of a user device according to various exemplary embodiments of the present disclosure.
Figure 5B:
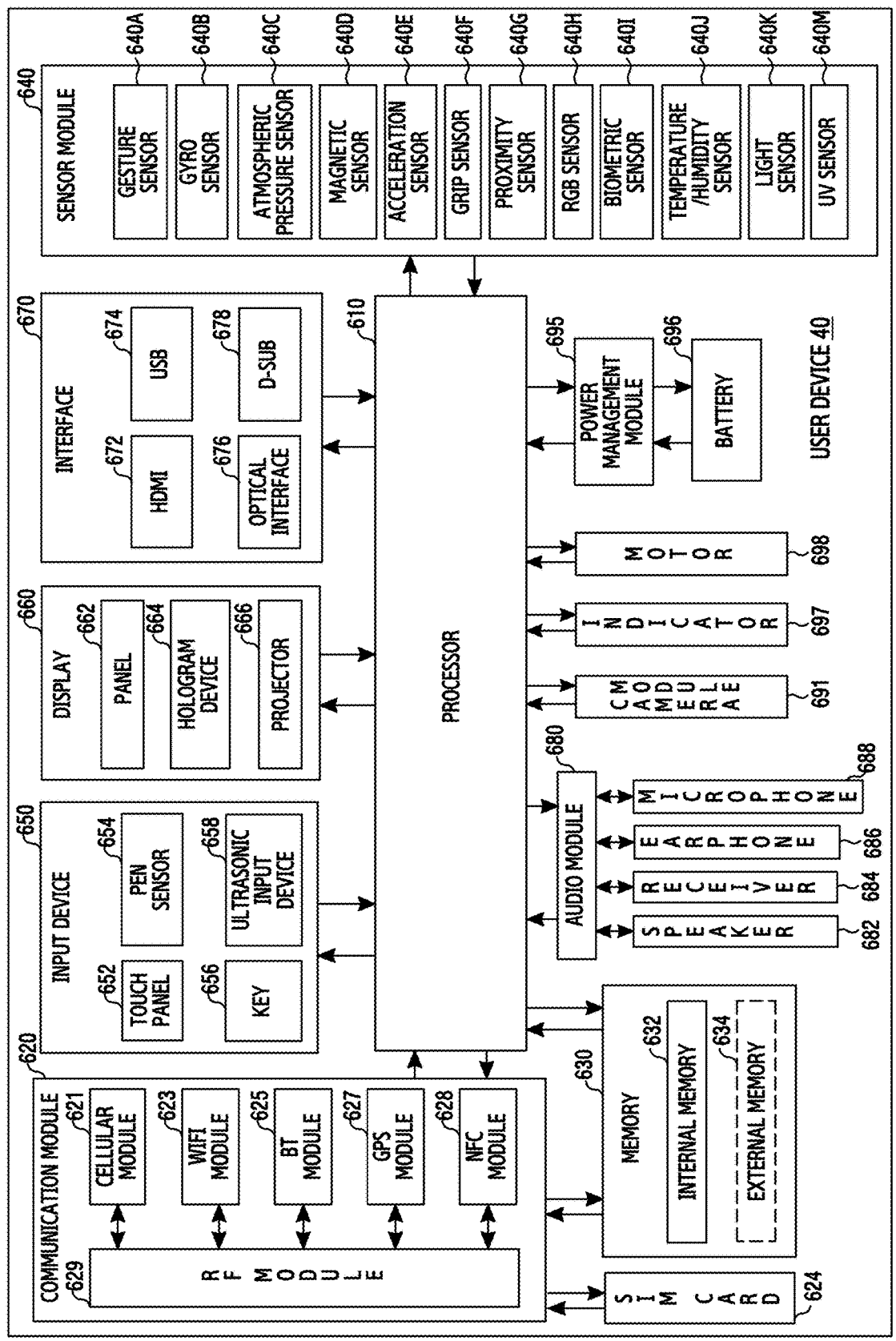

FIGS. 5A and 5B illustrate views showing a structure of a user device 40 according to various exemplary embodiments of the present disclosure.

FIG. 5A illustrates a block diagram of a program module of the user device 40 according to an exemplary embodiment, and FIG. 5B illustrates a block diagram of the user device 40 according to an exemplary embodiment.

Although the hub device 20 and the user device 40 are distinguished from each other in FIGS. 1A to 1C, the role of the hub device 20 may be performed by the user device 40 on behalf of the hub device 20. For example, the elements of the hub device 20 of the present disclosure and operations performed using the elements may be implemented by at least one of a software module and a hardware module and may be provided in the user device 40.

In addition, in FIGS. 1A to 1C, the roles of the smart lamp 10 and the hub device 20 may be performed by the user device 40. For example, when the user device 40 is provided with a light emitting device, the user device 40 may directly register the IoT device 30 at the user device 40 using the light emitting device (for example, an LED or the like) provided in the user device 40.

FIG. 5A illustrates a block diagram of a program module of the user device 40 according to an exemplary embodiment. According to an exemplary embodiment, the program module 500 may include an Operation System (OS) for controlling resources related to the user device 40 and/or various applications driven on the OS. For example, the OS may be ANDROID®, iOS®, WINDOWS®, SYMBIAN®, TIZEN®, SAMSUNG BADA®, or the like.

The program module 500 may include a kernel 510, middleware 530, an application programming interface (API) 560, and/or an application 570. At least a part of the program module 310 may be preloaded on the user device 40 or downloaded from an external electronic device (for example, a server).

For example, the kernel 510 may include a system resource manager 511 or a device driver 513. The system resource manager 511 may control, allocate or collect the system resources. According to an exemplary embodiment, the system resource manager 511 may include a process manager, a memory manager, a file system manager, and the like. The device driver 513 may include a display driver, a camera driver, a Bluetooth driver, a shared memory driver, a universal serial bus (USB) driver, a keypad driver, a WiFi driver, an audio driver, or an inter-process communication (IPC) driver, for example.

The middleware 530 may provide functions which are commonly required by the application 570 or may provide various functions to the application 570 through the API 560 such that the application 370 can effectively use limited system resources in the electronic device. According to an exemplary embodiment, the middleware 530 may include at least one of a runtime library 535, an application manager 541, a window manager 542, a multimedia manager 543, a resource manager 544, a power manager 545, a database manager 546, a package manager 547, a connectivity manager 548, a notification manager 549, a location manager 550, a graphic manager 551, or a security manager 552.

For example, the runtime library 535 may include a library module which is used by a compiler to add a new function through a programming language while the application 570 is running. The runtime library 535 may perform input/output management, memory management, an arithmetic function, and the like. The application manager 541 may manage a life cycle of the application 570, for example. The window manager 542 may manage GUI resources used in a screen. The multimedia manager 543 grasps a format necessary for reproducing various media files and encodes or decodes the media files by using a Codec suited to the corresponding format. The resource manager 544 may manage a source code of the application 570 or a space of a memory. The power manager 545 may manage capacity of a battery or power and provide power information necessary for operations of the electronic device. According to an exemplary embodiment, the power manager 545 may interwork with a basic input/output system (BIOS). The database manager 546 may generate, search, or change a database which is used in the application 570. The package manager 547 may manage installing or updating of an application which is distributed in the form of a package file.

The connectivity manager 548 may manage wireless connection, for example. The notification manager 549 may provide an event such as a message arrived, an appointment, a notification of proximity to the user, for example. The location manager 550 may manage location information of the electronic device, for example. The graphic manager 551 may manage a graphic effect to be provided to the user or a relevant user interface, for example. The security manager 552 may provide system security or user authentication, for example. According to an exemplary embodiment, the middleware 530 may include a telephony manager to manage a speech or video telephony function of the electronic device. According to an exemplary embodiment, the middleware 530 may provide a module which is customized according to a kind of OS.

The middleware 530 may include a middleware module which forms a combination of various functions of the above-described components. The middleware 530 may provide a module which is customized according to a kind of OS to provide a distinct function. In addition, the middleware 530 may dynamically delete some of the existing components or may add new components.

The API 560 is a set of API programming functions and may be provided as a different configuration according to an OS. For example, in the case of ANDROID® or iOS®, a single API set may be provided for each platform. In the case of TIZEN®, two or more API sets may be provided for each platform.

For example, the application 570 may include one or more applications for providing functions, such as controlling things 571, a dialer 572, a short message service (SMS)/multimedia messaging service (MMS) 573, a messenger (for example, an instant message) 574, a browser 575, a camera 576, an alarm 577, an address book 578, settings 579, an email 580, a calendar 581, a media player 582, an gallery 583, a clock 584, or health care (for example, measuring exercise or a blood glucose), or providing environmental information (for example, information on atmospheric pressure, humidity, or temperature), for example. According to an exemplary embodiment, the application 570 may include an information exchange application for supporting information exchange between the user device 40 and an external electronic device. The information exchange application may include a notification relay application for relaying specific information to an external electronic device or a device management application for managing an external electronic device. For example, the notification relay application may relay notification information generated by another application of the user device 40 to an external electronic device, or may receive notification information from an external electronic device and may relay the same to the user. For example, the device management application may install, delete or update a function of an external electronic device communicating with the user device 40 (for example, turning on/off an external electronic device (or some parts) or adjusting brightness (or resolution) of a display), or an application operating in the external electronic device. According to an exemplary embodiment, the application 570 may include an application (for example, a health care application of a mobile medical device) which is specified according to the attribute of an external electronic device. According to an exemplary embodiment, the application 570 may include an application received from an external electronic device.

According to various exemplary embodiments, at least a part of the program module 500 may be implemented by software, firmware, hardware, or a combination of two or more of them. At least a part of the program module 500 may be implemented (for example, executed) by a processor (for example, an application program). At least a part of the program module 500 may include a module, a program, a routine, sets of instructions, or a process to perform one or more functions, for example.

FIG. 5B illustrates a block diagram of the user device 40 according to an exemplary embodiment of the present disclosure. Referring to FIG. 5B, the user device 40 may include one or more processors (for example, an application processor (AP)) 610, a communication module 620, a subscriber identification module (SIM) card 624, a memory 630, a sensor module 640, an input device 650, a display 660, an interface 670, an audio module 680, an image sensor module 691, a power management module 695, a battery 696, an indicator 697, or a motor 698.

The processor 610 may control a plurality of hardware or software components connected to the processor 610 by driving an operating system or an application program, and may process and calculate a variety of data including multimedia data.

According to an exemplary embodiment, the processor 610 may execute a managing application for registering the IoT device 30. In addition, the processor 610 may receive a user input to request registration of a new IoT device 30 through the screen of the managing application. According to the user input, the processor 610 may transmit a signal for requesting the registration of the IoT device 30 to the hub device 20. When the hub device 20 completes the registration of the new IoT device 30 using the smart lamp 10, the processor 610 may receive the result of the registration of the new IoT device 30. Accordingly, identification information of the IoT device 30 which can be controlled by the processor 610 may be displayed on the screen of the managing application.

The communication module 620 (for example, a communication circuit) may transmit and receive data in communication between the user device 40 and other electronic devices connected via a network (for example, the smart lamp 10, the hub device 20, or the IoT device 30). According to an exemplary embodiment, the communication module 620 may include a cellular module 621, a WiFi module 623, a BT module 625, a global positioning system (GPS) module 627, a near field communication (NFC) module 628, and an RF module 629.

In FIG. 5B, the cellular module 621, the WiFi module 623, the BT module 625, the GPS module 627, and the NFC module 628 share the single RF module 629 with one another. However, according to an exemplary embodiment, at least one of the cellular module 621, the WiFi module 623, the BT module 625, the GPS module 627, or the NFC module 628 may transmit and receive an RF signal via a separate RF module.

According to an exemplary embodiment, the RF module 629 may include at least one of a main antenna and a sub antenna functionally connected with the user device 40. The communication module 620 may support a multiple input multiple output (MIMO) service such as diversity using the main antenna and the sub antenna.

The memory 630 may include an internal memory 632 or an external memory 634. Examples of the memory 630 will not be described in detail by dealing with the example of the memory 220 of the smart lamp 10 of FIG. 2.

The sensor module 640 may measure a physical quantity or detect an operation state of the user device 40, and may convert measured or detected information into electric signals. Examples of the sensor module 640 will not be described in detail by dealing with the example of the sensor module 340 of the IoT device 30 of FIG. 3.

The input device 650 may include a touch panel 652, a (digital) pen sensor 654, a key 656, or an ultrasonic input device 658. The touch panel 652 may use at least one method of capacitive, resistive, infrared, and ultrasonic methods. In addition, the touch panel 652 may further include a control circuit. The touch panel 652 may further include a tactile layer to provide a tactile response to the user. For example, the (digital) pen sensor 654 may be a part of the touch panel or may include a separate sheet for recognition. The key 656 may include a physical button, an optical key, or a keypad. The ultrasonic input device 658 may detect ultrasonic waves generated in an input tool through a microphone (for example, the microphone 688), and identify data corresponding to the detected ultrasonic waves.

The display 660 may include a panel 662, a hologram device 664, a projector 666, and/or a control circuit for controlling the above-mentioned devices. For example, the panel 662 may be implemented to be flexible, transparent, or wearable. The panel 662 may be configured as a single module along with the touch panel 652. According to an exemplary embodiment, the panel 662 may include a pressure sensor (or a force sensor) to measure an intensity of pressure on a user's touch. The pressure sensor may be implemented to be integrated into the touch panel 652 or may be implemented as one or more sensors separate from the touch panel 652.

The interface 670 may include a high definition multimedia interface (HDMI) 672, a universal serial bus (USB) 274, an optical interface 676, or D-subminiature (D-sub) 678.

The audio module 680 may convert a sound and an electric signal bidirectionally. For example, the audio module 680 may process sound information which is inputted or outputted through a speaker 682, a receiver 684, an earphone 686, or a microphone 688.

The image sensor module 691 is a device for capturing a still image and a moving image, and, according to an exemplary embodiment, the image sensor module 691 may include one or more image sensors (for example, a front surface sensor or a rear surface sensor), a lens (not shown), an image signal processor (ISP), or a flash (for example, an LED or a xenon lamp).

The power management module 695 may manage power of the user device 40.

The indicator 697 may display a specific state of the user device 40 or a part of it (for example, the processor 610), for example, a booting state, a message state, or a charging state.

The motor 698 may convert an electric signal into a mechanical vibration.

Each of the above-described elements of the user device 40 according to an exemplary embodiment of the present disclosure may include one or more components, and the names of the elements may vary according to the kind of the user device 40. According to an exemplary embodiment of the present disclosure, the electronic device may include at least one of the above-described elements, and some of the elements may be omitted or an additional element may be further included. In addition, some of the elements of the electronic device according to an exemplary embodiment of the present disclosure may be combined into a single entity, and may perform the same functions as those of the elements before being combined.

According to an exemplary embodiment of the present disclosure, an electronic device may include: a wireless communication circuit set to establish wireless communication with a first external device; a light emitting device set to emit light; and a control circuit electrically connected with the wireless communication circuit and the light emitting device, and set to share information on a location of the electronic device with the first external device. The control circuit may be set to receive a first signal from the first external device via the wireless communication circuit, and, in response to the first signal, the light emitting device may be set to emit light according to a selected flashing pattern which indicates at least a part of the location of the electronic device.

According to an exemplary embodiment, after the light is emitted, the control circuit may be set to receive a second signal from a second external device, and the second signal may include information for wirelessly connecting the second external device with the first external device.

According to an exemplary embodiment, the control circuit may be set to transmit, to the first external device, at least a part of the information included in the received second signal via the wireless communication circuit.

According to an exemplary embodiment, the information for wirelessly connecting the second external device with the first external device may include response information on a flashing pattern based on illuminance sensed by the second external device and relevant illuminance data.

According to an exemplary embodiment, the light emitting device may include a bulb or an LED.

According to an exemplary embodiment, the first signal may include information on a flashing pattern of light to be emitted by the electronic device.

According to an exemplary embodiment, the flashing pattern indicating the at least part of the location of the electronic device may be determined according to at least one of a number of times light is emitted during a predetermined time, a flashing frequency, a color of flashing light, and brightness of flashing light.

According to an exemplary embodiment, a first external device may include: a wireless communication circuit set to communicate with an electronic device and a second external device; and a control circuit electrically connected with the wireless communication circuit and set to register the second external device, and the control circuit may be set to: select a flashing pattern of the electronic device emitting light toward the second external device; transmit a first signal including information on the selected flashing pattern to the electronic device; when the electronic device emits light according to the flashing pattern in response to the first signal, receive response information on the flashing pattern from the second external device via the wireless communication circuit; and, based on the received flashing pattern, register the second external device.

According to an exemplary embodiment, when the second external device is connected with a plurality of electronic devices, the control circuit may be set to select different flashing patterns on the plurality of electronic devices.

According to an exemplary embodiment, when the second external device is registered based on the received flashing pattern, the control circuit is set to determine whether the flashing pattern included in the response information is consistent with or similar to the flashing pattern transmitted to the electronic device.

Hereinafter, various exemplary embodiments of the systems of FIGS. 1A to 1C in which the IoT device 30 is registered at the hub device 20 will be described.

FIGS. 6 to 11 illustrate flowcharts showing a process of the hub device 20 registering the IoT device 30 according to an exemplary embodiment of the present disclosure.

Figure 6:
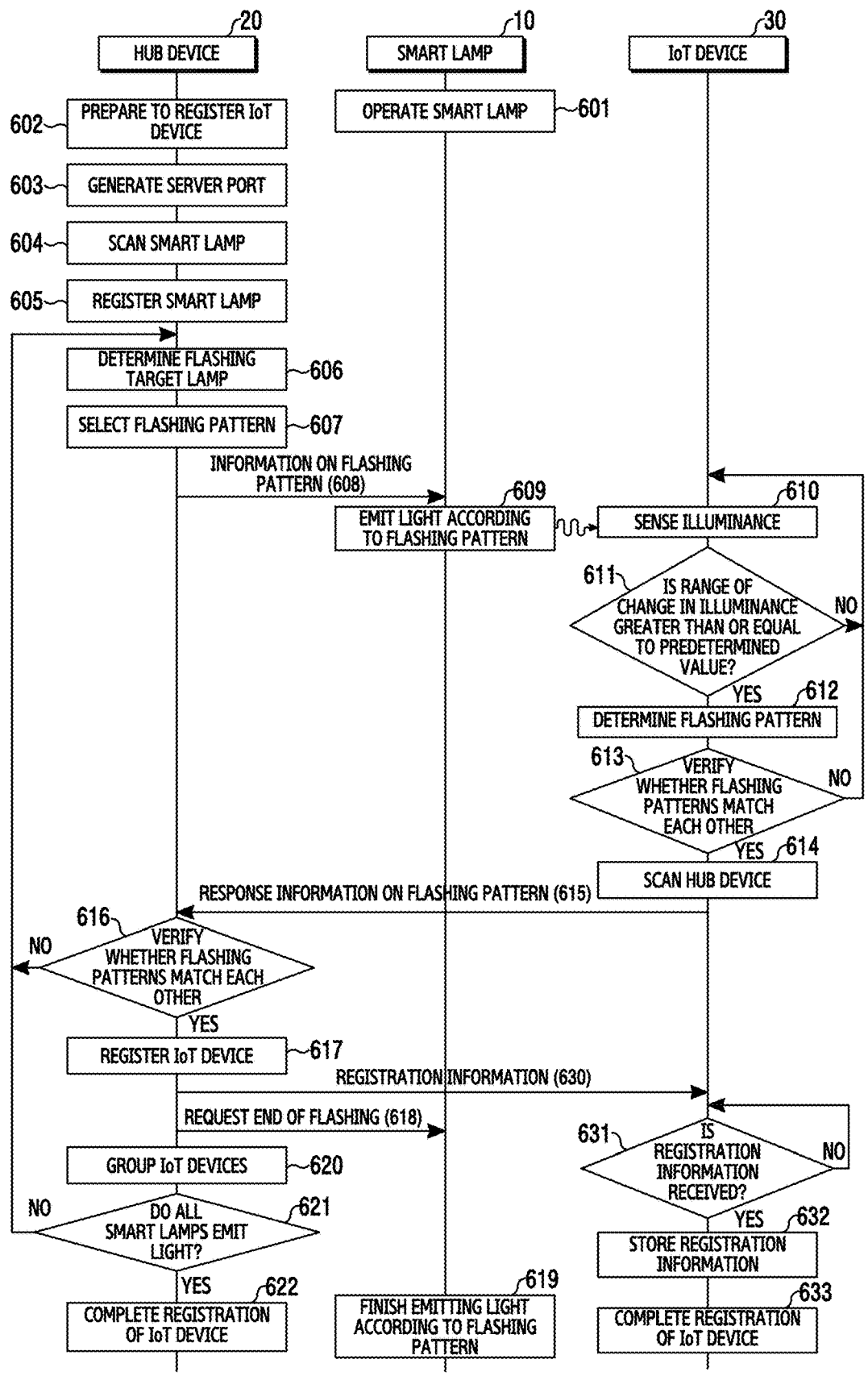
FIGS. 6 to 11 illustrate flowcharts showing a process of a hub device registering an IoT device according to various exemplary embodiments of the present disclosure.

Referring to FIG. 6, the smart lamp 10 may operate (601). For example, the smart lamp 10 may be turned on when the smart lamp 10 is mounted into a socket or power is supplied.

The hub device 20 may be prepared to register the IoT device 30 (602). To achieve this, the hub device 20 may call logic to register the IoT device 30 or call an interface (for example, an API or the like) to register the IoT device 30.

For example, when an event signal is generated after the smart lamp 10 is prepared (for example, after the smart lamp 10 is mounted into the socket or the smart lamp 10 switches from an off state to an on state, the hub device 20 may be prepared to register the IoT device 30. Alternatively, when a user input to request registration of a new IoT device 30 is received via the user device 40 or the hub device 20 of FIG. 1A, the hub device 20 may be prepared to register the IoT device 30.

When the registration of the IoT device 30 is prepared, the hub device 20 may generate a server port (603). The server port may include a port for allowing the hub device 20 to transmit/receive data to/from the IoT device 30. In general, the hub device 20 may transmit/receive data to/from a plurality of IoT devices 30 via a single server port, but, according to various exemplary embodiments, ports may be generated for the plurality of IoT devices 30. In this case, security between the hub device 20 and the IoT devices 30 can be tightened.

Next, the hub device 20 may scan at least one smart lamp 10 located nearby (604). For example, the hub device 20 may scan a plurality of neighbor smart lamps 10 according to a ZIGBEE®, Z-WAVE®, or BLUETOOTH® communication method.

Next, the hub device 20 may register the plurality of scanned smart lamps 10 (605). For example, the hub device 20 may establish a communication connection with the plurality of scanned smart lamps 10, and may generate a connection list including identification information of the plurality of smart lamps 10.

Next, the hub device 20 may refer to the plurality of registered smart lamps 10 and determine a flashing target smart lamp 10 for registering the IoT device 30 from among the plurality of smart lamps 10 (606). For example, the flashing target smart lamp 10 may be determined in sequence according to an order of registration of the plurality of smart lamps 10 or a distance to each of the plurality of smart lamps 10. In this case, a problem that the IoT device 30 already registered at the hub device 20 is redundantly registered at the hub device 20 can be prevented. In addition, interference of light which may be caused when the plurality of smart lamps 10 emit light simultaneously and a failure to register the IoT device 30 accordingly can be minimized.

When the flashing target smart lamp 10 is determined, a flashing pattern of light to be emitted by the smart lamp 10 may be selected (607). In this case, the selected flashing pattern may be randomly selected by the hub device 20 or may be selected by the user, or may be selected by a manufacturer of the hub device 20 or the smart lamp 10 in advance. For example, the flashing pattern may be determined by at least one of the number of times the smart lamp 10 flashes during a predetermined time, a flashing frequency, a color of flashing light, and brightness of flashing light. In addition, a different flashing pattern may be selected for each of the plurality of smart lamps 10 which are placed in different locations. Accordingly, the locations of the plurality of smart lamps 10 may be distinguished from one another according to the flashing patterns.

When the flashing pattern is selected, the hub device 20 may establish wireless communication with the smart lamp 10. For example, pairing between the hub device 20 and the smart lamp 10 may be performed.

The hub device 20 may transmit a signal including information on the selected flashing pattern to the smart lamp 10 via a channel which is formed according to the pairing (608).

In response to the received signal, the smart lamp 10 may emit light according to the selected flashing pattern (609). For example, the smart lamp 10 may emit light according to the selected number of times of flashing, the selected flashing frequency, the selected color of the flashing light, and the selected brightness of the flashing light.

When the smart lamp 10 emits light, the IoT device 30 may sense illuminance (610).

In addition, the IoT device 30 may determine whether a range of a change in illuminance between previous illuminance and current illuminance is greater than or equal to a predetermined value based on illuminance data (611).

When the range of the change in the illuminance is greater than or equal to the predetermined value (YES of 611), the IoT device 30 may determine the flashing pattern of the smart lamp 10 (612). In addition, the IoT device 30 may verify whether the determined flashing pattern matches a flashing pattern method for registering the IoT device 30 (613). In this case, the flashing pattern method for registering the IoT device 30 may be pre-stored in the IoT device 30. Examples of the flashing pattern method will be described in detail below with reference to FIGS. 15 to 18.

On the other hand, when the range of the change in the illuminance is less than the predetermined value (NO of 611), the IoT device 30 may continuously sense illuminance and determine whether the range of the change in the illuminance is greater than or equal to the predetermined value.

When the determined flashing pattern matches the flashing pattern method (YES of 613), the IoT device 30 may scan the neighbor hub device 20 (614). In addition, the IoT device 30 may transmit a signal including response information on the flashing pattern of the smart lamp 10 to the scanned hub device 20 (615). On the other hand, when the determined flashing pattern does not match the flashing pattern method (NO of 613), the IoT device 30 may continuously sense illuminance and determine again whether the range of the change in the illuminance is greater than or equal to the predetermined value.

The hub device 20 which receives the signal including the response information on the flashing pattern from the IoT device 30 may verify and determine whether the received flashing pattern matches the flashing pattern method for registering the IoT device 30 (616). For example, the hub device 20 may determine whether the received flashing pattern is consistent with or similar to the flashing pattern transmitted to the smart lamp 10. Alternatively, when the hub device 20 transmits information on the flashing pattern to the plurality of smart lamps 10, the hub device 20 may determine which of the flashing patterns transmitted to the plurality of smart lamps 10 corresponds to the received flashing pattern.

When the received flashing pattern matches the flashing pattern method (YES of 616), the hub device 20 may register the IoT device which has transmitted the matching flashing pattern (617). For example, when identification information of the IoT device 30 is received with the information on the flashing pattern, the hub device 20 may register the received identification information in a registration area of the IoT device 30. In other words, the hub device 20 may register the IoT device 30 as a target device to be connected for communication (for example, to be paired).

Next, the hub device 20 may transmit a signal for requesting the end of the flashing of the smart lamp 10 to the smart lamp 10 (618). The smart lamp 10 which receives the flashing end request signal may finish emitting light according to the flashing pattern (619).

According to an exemplary embodiment, the signal for requesting the end of the flashing of the smart lamp 10 may be transmitted to the smart lamp 10 before the operation (617) of registering the IoT device 30. For example, when the received flashing pattern matches the flashing pattern method (YES of 616), the hub device 20 may transmit the signal for requesting the end of the flashing of the smart lamp 10 to the smart lamp 10.

On the other hand, when the received flashing pattern does not match the flashing pattern method (NO of 616), the hub device 20 may determine another smart lamp 10 which does not flash in the connection list as a flashing target bulb.

When there are a plurality of IoT devices 30, the hub device 20 may receive signals including response information on a plurality of flashing patterns from the plurality of IoT devices 30. In this case, the hub device 20 may group the IoT devices 30 which have transmitted signals including response information on the same flashing pattern, and may store the grouped IoT devices 30 (620). That is, the hub device 20 may determine that the IoT devices 30 which have transmitted the same flashing pattern exist in the same physical space and may group these IoT devices 30 and store the grouped IoT devices 30.

Next, the hub device 20 may determine whether all of the registered smart lamps 10 emit light according to the flashing pattern (621). For example, the hub device 20 may determine whether all of the smart lamps 10 registered in operation 605 emit light according to the flashing pattern.

When all of the smart lamps emit light according to the flashing pattern (YES of 621), the hub device 200 may complete the registration of the IoT device 30 (622). Accordingly, a communication connection (for example, a pairing connection) may be performed between the hub device 20 and the IoT device 30.

On the other hand, when all of the smart lamps 10 included in the connection list do not emit light according to the flashing pattern (NO of 621), the hub device 20 may determine another smart lamp 10 which does not emit light in the connection list as the flashing target smart lamp 10.

Meanwhile, when the hub device 20 registers the IoT device 30 in operation 616, the hub device 20 may transmit a signal including registration information informing that the IoT device 30 is registered to the IoT device 30 (630). In this case, the registration information may include location information of the IoT device 30 (for example, information on a space or a place where the IoT device 30 is located), and identification information for distinguishing the IoT device 30 from other IoT devices 30.

The IoT device 30 may determine whether the registration information is received or not (631). When the registration information is received (YES of 613), the IoT device 30 may store the received registration information in the memory 320 (632). For example, the IoT device 30 may store the location information and the identification information of the IoT device 30 included in the registration information. In addition, the IoT device 30 may complete the registration of the IoT device 30 at the hub device 20 (633). Accordingly, a communication connection may be established between the IoT device 30 and the hub device 20.

According to another exemplary embodiment, when the hub device 20 receives the signal including response information on the plurality of flashing patterns from the plurality of IoT devices 30 in operation 615 of FIG. 6, the hub device 20 may process an operation according to the received response information by applying parallel logic in a non-blocking state. That is, the hub device 20 may proceed with the processes of registering and grouping the plurality of IoT devices 30 from operation 616 to operation 620 in parallel. To this end, the plurality of the IoT devices 30 may be registered simultaneously or almost simultaneously, and accordingly, complexity in time at which the plurality of IoT devices 30 are registered can be reduced.

Figure 7:
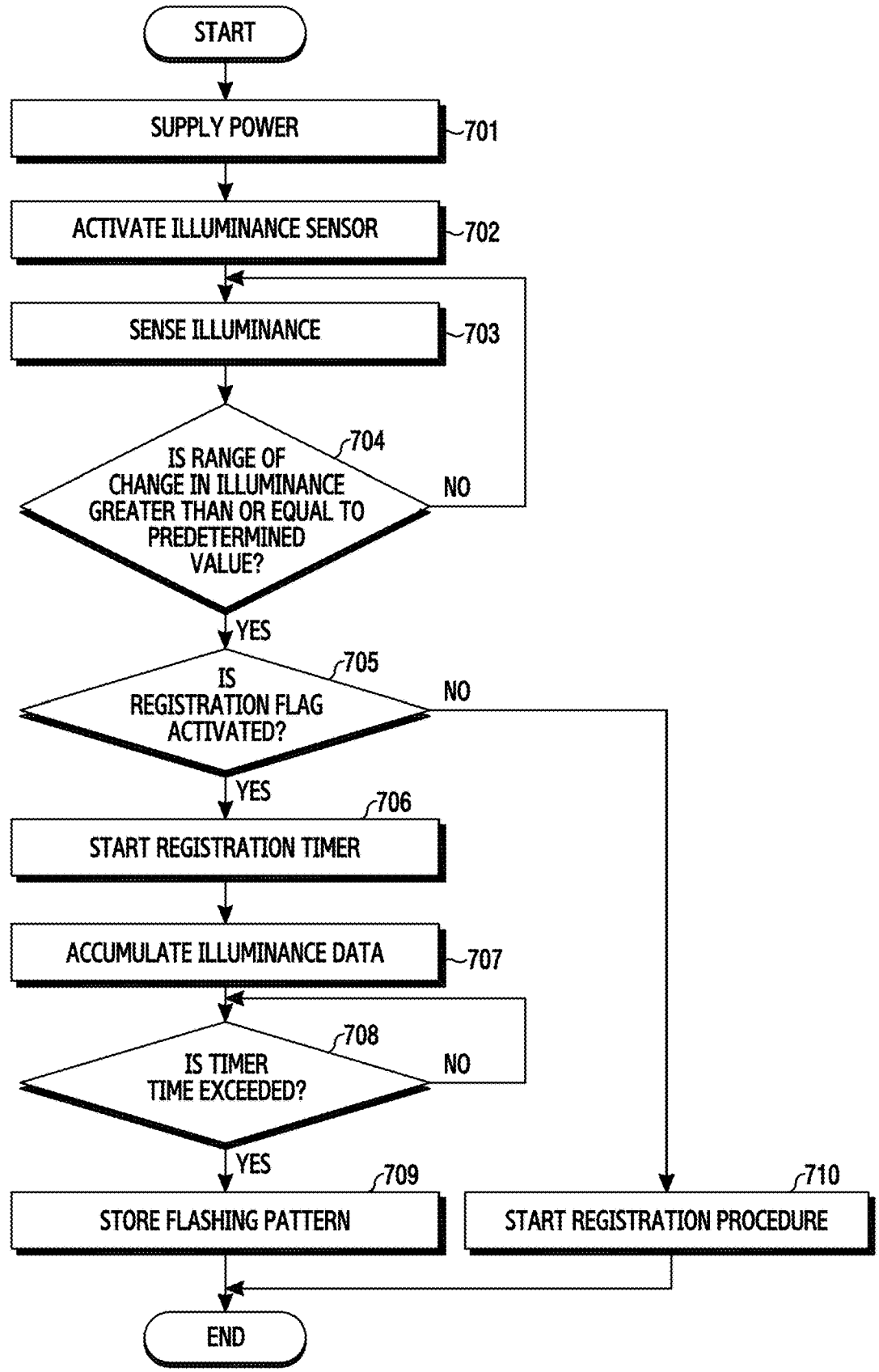

FIG. 7 illustrates a flowchart showing operations 610 and 612 of FIG. 6 in detail.

Referring to FIG. 7, the IoT device 30 of FIG. 1A may be activated based on power supply (701). For example, the IoT device 30 may be supplied with power when a battery is mounted into the IoT device 30 or the plug of the IoT device 30 is connected to a socket.

When power is supplied, the IoT device 30 may activate the illuminance sensor 341 of FIG. 3 (702). For example, when power is initially supplied to the IoT device 30, the IoT device 30 may automatically operate in a pairing mode to connect with an external device (for example, the hub device 20 of FIG. 1A).

When the illuminance sensor 341 is activated, the IoT device 30 may sense illuminance of ambient light of the IoT device 30 via the illuminance sensor 341 (703). For example, the IoT device 30 may call an interface for converting the illuminance sensed by the illuminance sensor 341 into illuminance data by means of logic stored in the memory 320, and may acquire illuminance data using the called interface.

The IoT device 30 may determine whether a range of a change in illuminance between previous illuminance and current illuminance is greater than or equal to a predetermined value based on the illuminance data (704). For example, previously sensed illuminance data may be stored on the memory 320 (for example, a buffer) of the IoT device 30. In this case, the IoT device 30 may compare illuminance data stored in the memory 320 and illuminance data related to currently sensed illuminance, and determine whether the range of the change in the illuminance between the previous illuminance and the current illuminance is greater than or equal to the predetermined value or not. In this case, the IoT device 30 may continuously store the illuminance data related to the currently sensed illuminance in the memory 320 to be compared with illuminance data related to illuminance which will be sensed afterward.

When the range of the change is greater than or equal to the predetermined value (for example, the range of the change is greater than or equal to 15% (YES of 704), the IoT device 30 may determine whether a registration flag is activated or not (705).

On the other hand, when the range of the change is less than the predetermined value (for example, the range of the change is less than 15%) (NO of 704), the IoT device 30 may sense illuminance and continuously determine whether the range of the change in the illuminance is greater than or equal to the predetermined value.

When the registration flag is activated (YES of 705), the IoT device 30 may start a registration timer to limit time to store a flashing pattern (706). In addition, the IoT device 30 may continuously accumulate and store the illuminance data (707).

Next, the IoT device 30 may determine whether timer time is exceeded or not (708). When the timer time is exceeded (YES of 708), the IoT device 30 may store the flashing pattern of the smart lamp 10 according to the accumulated and stored illuminance data (709).

On the other hand, when the registration flag is inactivated in operation 705 (NO of 705), the IoT device 30 may start the registration procedure of the IoT device 30 (710). For example, the IoT device 30 may not use the flashing pattern and may transmit the identification information of the IoT device 30 to the hub device 20, such that the normal registration procedure of registering the IoT device 30 at the hub device 20 can be performed.

Figure 8:
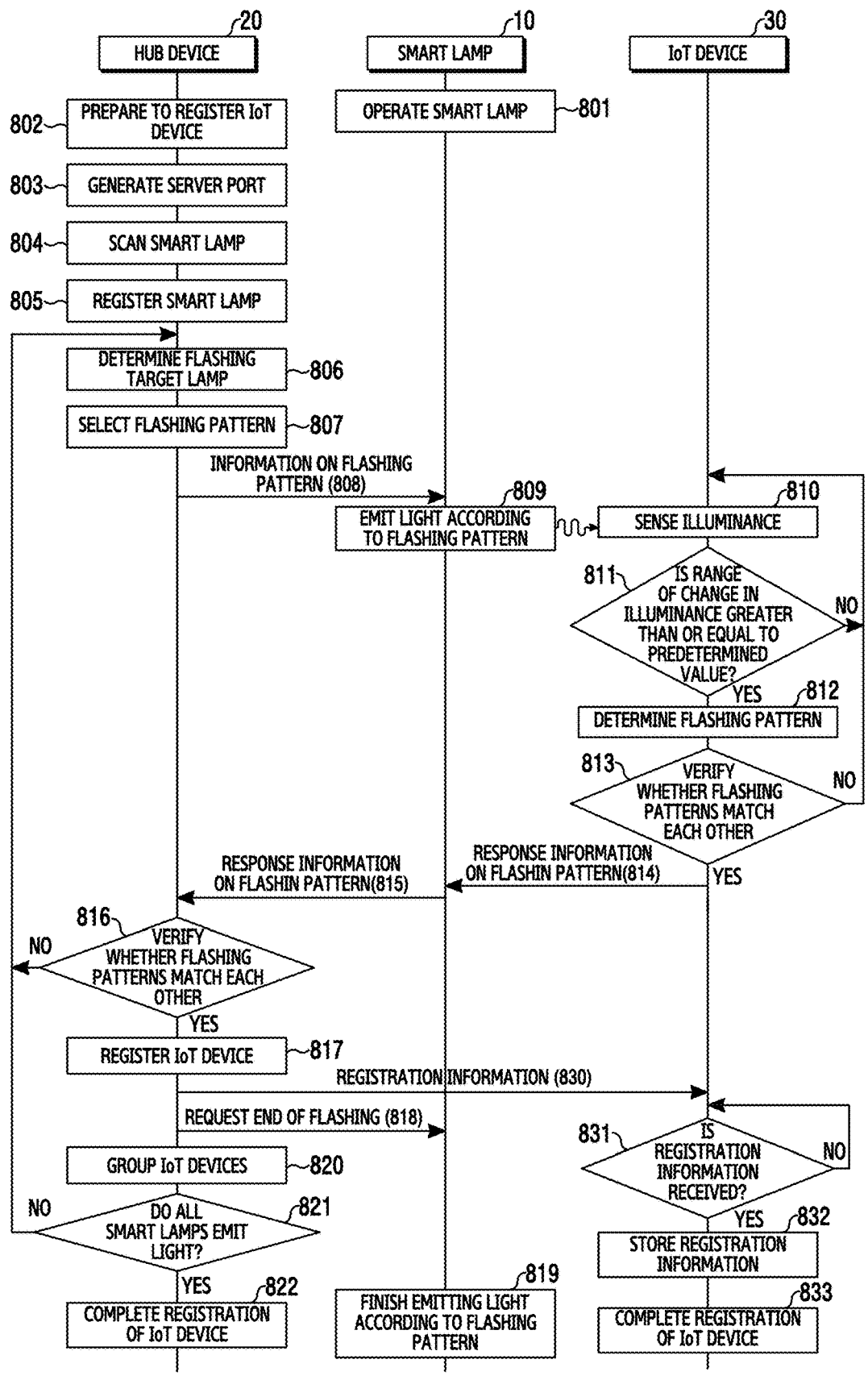

FIG. 8 illustrates a flowchart showing a process of the hub device 20 registering the IoT device 30 according to another exemplary embodiment of the present disclosure.

In FIG. 8, when the hub device 20 transmits information on a flashing pattern to the smart lamp 10 in order to register the IoT device 30, the IoT device 30 which senses illuminance of light emitted by the smart lamp 10 may verify whether the flashing pattern of the smart lamp 10 matches a flashing pattern method. Since operations 801 to 813 according to these operations correspond to operations 601 to 613 of FIG. 6, a detailed description of operations 801 to 813 is omitted.

When the IoT device 30 succeeds in verifying the flashing pattern (YES of 813), the IoT device 30 may transmit a signal including response information on the flashing pattern to the smart lamp 10 (814). In this case, the signal including the response information may be information for connecting the IoT device 30 to the hub device 20.

The smart device 10 which receives the signal including the response information on the flashing pattern may forward the received signal to the hub device 20 connected therewith for communication (815).

The hub device 20 which receives the signal including the response information on the flashing pattern may verify the received flashing pattern, and may register the IoT device 30 at the hub device 20 according to a result of the verifying. Accordingly, since operations 816 to 833 according to these operations correspond to operations 616 to 633 of FIG. 6, a detailed description of operations 816 to 833 is omitted.

Figure 9:
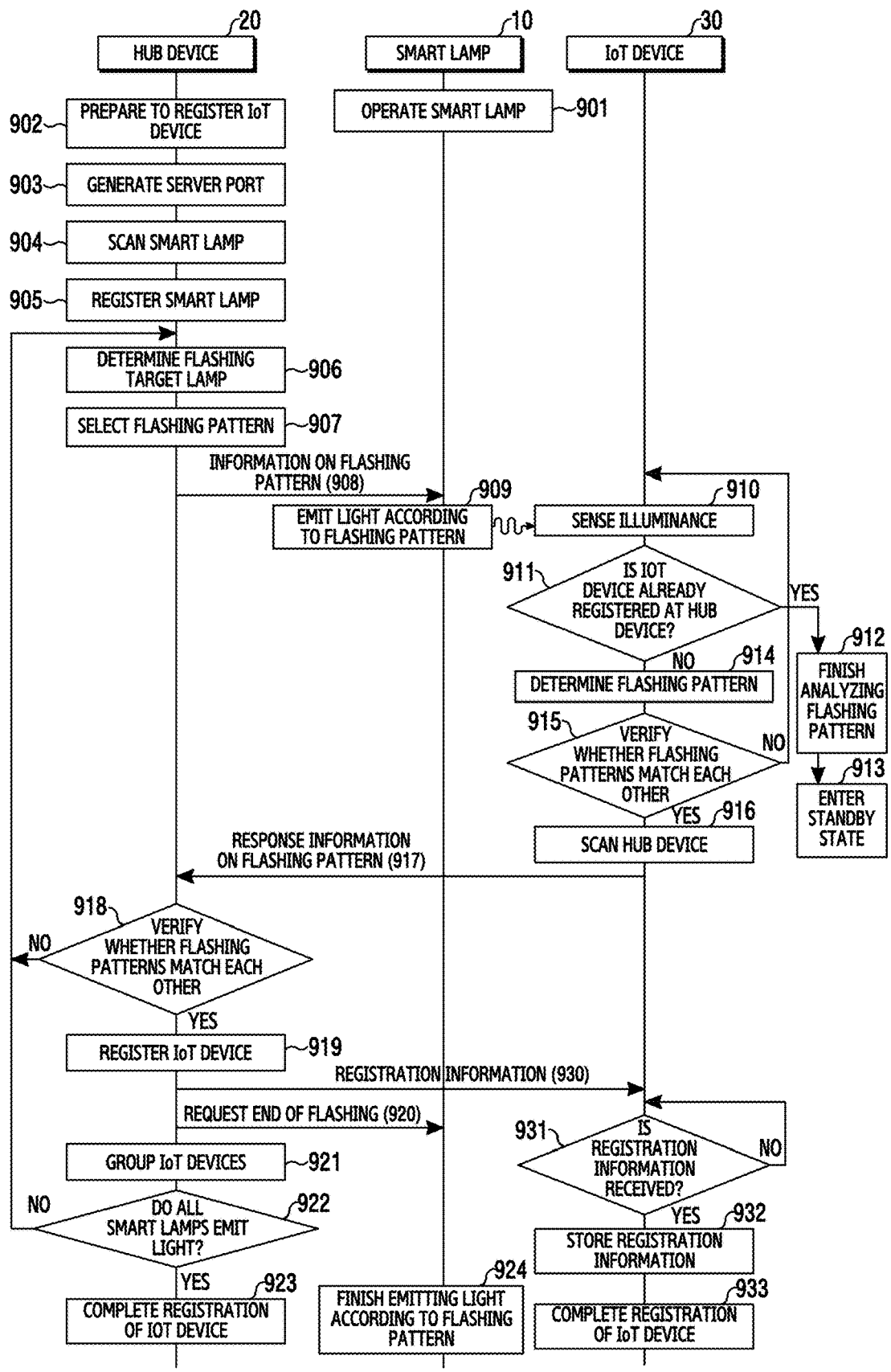

FIG. 9 illustrates a flowchart showing a process of the hub device 20 registering the IoT device 30 according to another exemplary embodiment of the present disclosure.

When the hub device 20 registers the IoT device 30, some of IoT devices 30 may be already registered at the hub device 20. In this case, the IoT device 30 may omit to analyze a flashing pattern of light emitted by the smart lamp 10.

Referring to FIG. 9, the hub device 20 may control the smart lamp 10 to emit light according to a flashing pattern in order to register the IoT device 30. Since operations 901 to 909 according to these operations correspond to operations 602 to 609 of FIG. 6, a detailed description of operations 901 to 909 is omitted.

When the smart lamp 10 emits light, the IoT device 30 may sense ambient illuminance.

The IoT device 30 which senses the illuminance may determine whether the IoT device 30 itself is already registered at the hub device 20 or not (911). In this case, only when a range of a change in illuminance is greater than or equal to a predetermined value, the IoT device 30 may determine whether the IoT device 30 itself is already registered at the hub device 20.

When the IoT device 30 is already registered at the hub device 20 (YES of 911), the IoT device 30 may disregard the sensed illuminance and relevant illuminance data, and may finish analyzing the flashing pattern based on the illuminance data (912). In addition, the IoT device 30 may enter a standby state (913).

On the other hand, when the IoT device 30 is not already registered at the hub device 20 (NO of 911), the IoT device 30 may continuously perform the procedure of registering at the hub device 20. Since operations 914 to 933 according to these operations correspond to operations 612 to 633 of FIG. 6, a detailed description of operations 914 to 933 is omitted.

As described above, when the already registered IoT device 30 disregards a change in the illuminance, the process of analyzing the flashing pattern may be omitted, such that power consumption in the IoT device 30 can be reduced. When the IoT device 30 is already registered, but the hub device 20 and the IoT device 30 are disconnected from each other, the IoT device 30 may determine again whether the IoT device 30 itself is already registered at the hub device 20 in order to be registered again.

Figure 10:
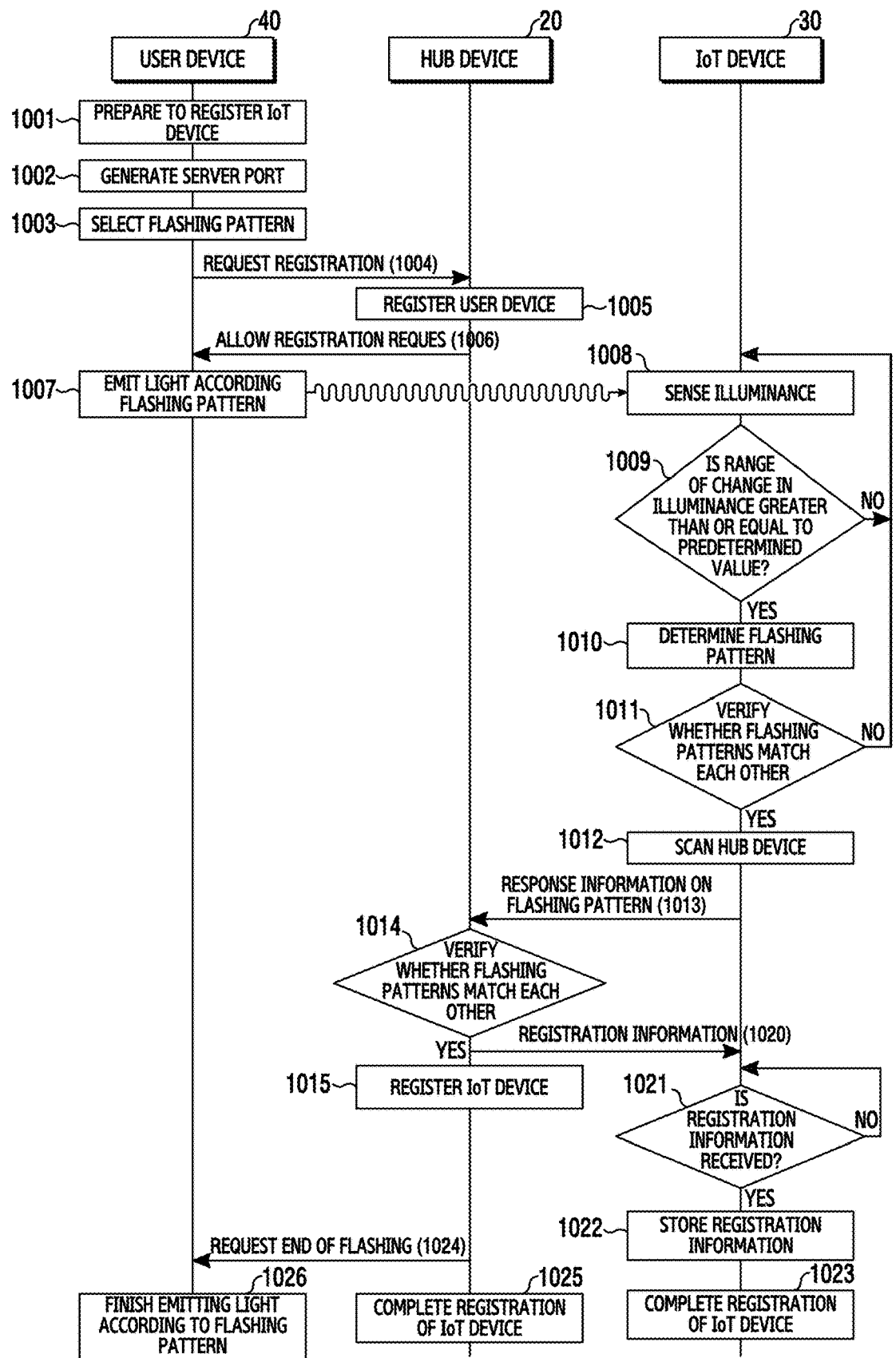

FIG. 10 illustrates a flowchart showing a process of the hub device 20 registering the IoT device 30 according to another exemplary embodiment of the present disclosure.

When the plurality of IoT device 30 are registered using the plurality of smart lamps 10 of FIG. 1A, there may be difficulty in registering the IoT devices 30 due to interference of light emitted by the smart lamps 10. Alternatively, in an environment in which it is difficult to detect the smart lamp 10 flashing, for example, in a case in which the IoT device 30 is placed out of a light emission range of the smart lamp 10 or is placed in a region where it is difficult to sense illuminance, it may be difficult to register the IoT device 30.

In this case, the user may arrange the smart lamps 10 to be spaced from one another so as to prevent light emitted by the smart lamp 10 from interfering with one another, and then may register the IoT devices 30 in their respective spaces.

Alternatively, the user may register the IoT device 30 using a light emitting device (for example, an LED, the display 660, or the like) provided in the user device 40.

Referring to FIG. 10, the user may prepare to register the IoT device 30 using the user device 40 (1001). For example, the user may execute a managing application for the IoT device 30, and perform a function of registering the IoT devices 30 on the screen of the managing application.

When the registration of the IoT device 30 is prepared, the user device 40 may generate a server port (1002).

Next, the user device 40 may select a flashing pattern of light to be flashed by the light emitting device provided in the user device 40 (1003). For example, the user device 40 may select a flashing pattern of light to be flashed by the light emitting device based on a user input which is detected through the input device 650 of FIG. 5B. Alternatively, the user device 40 may randomly generate a flashing pattern of light to be flashed by the light emitting device using a function or a table. Alternatively, the user device 40 may acquire a flashing pattern randomly generated from the hub device 20.

When the flashing pattern is selected, the user device 40 may transmit, to the hub device 20, a registration request signal to request the hub device 20 to register the user device 40 as a device replacing the smart lamp 10 (1004). In this case, the user device 40 may also transmit a signal including information on the flashing pattern selected in operation 1003.

The hub device 20 which receives the information on the registration request signal may register the user device 40 as a device replacing the smart lamp 10 (1005). In addition, when the information on the flashing pattern is received, the hub device 20 may store the information on the flashing pattern. The information on the flashing pattern may be used for the hub device 20 to verify a flashing pattern receive from the IoT device 30 afterward.

When the user device 40 is registered at the hub device 20, the hub device 20 may transmit a signal for allowing the registration request to the user device 40 (1006).

The user device 40 which receives the signal for allowing the registration request may control the light emitting device of the user device 40 to emit light according to the selected flashing pattern (1007). For example, the user device 40 may control the light emitting device of the user device 40 to emit light based on the flashing pattern randomly selected in the hub device 20. For example, the user device 40 may identify the flashing pattern selected in the hub device 20 through the signal for allowing the registration request.

When the light emitting device of the user device 40 emits light according to the flashing pattern, the IoT device 30 may sense illuminance, determine a flashing pattern based on illuminance data related to the sensed illuminance, and transmit a signal including response information on the flashing pattern to the hub device 20. The hub device 20 which receives the signal including the response information on the flashing pattern may verify the flashing pattern, and, when the hub device 20 succeeds in verifying the flashing pattern, the hub device 20 may register the IoT device 30. Since operations 1008 to 1015 according to these operations correspond to operations 610 to 618 of FIG. 6 and operations 1020 to 1023 correspond to operations 630 to 633 of FIG. 6, a detailed description thereof is omitted.

The hub device 20 which registers the IoT device 30 may transmit, to the user device 40, a signal for requesting the end of the flashing of the light emitting device of the user device 40 (1024), and may complete the registration of the IoT device 30 (1025).

The user device 40 which receives the signal for requesting the end of the flashing of the light emitting device may finish emitting light according to the flashing pattern (1026).

Figure 11:
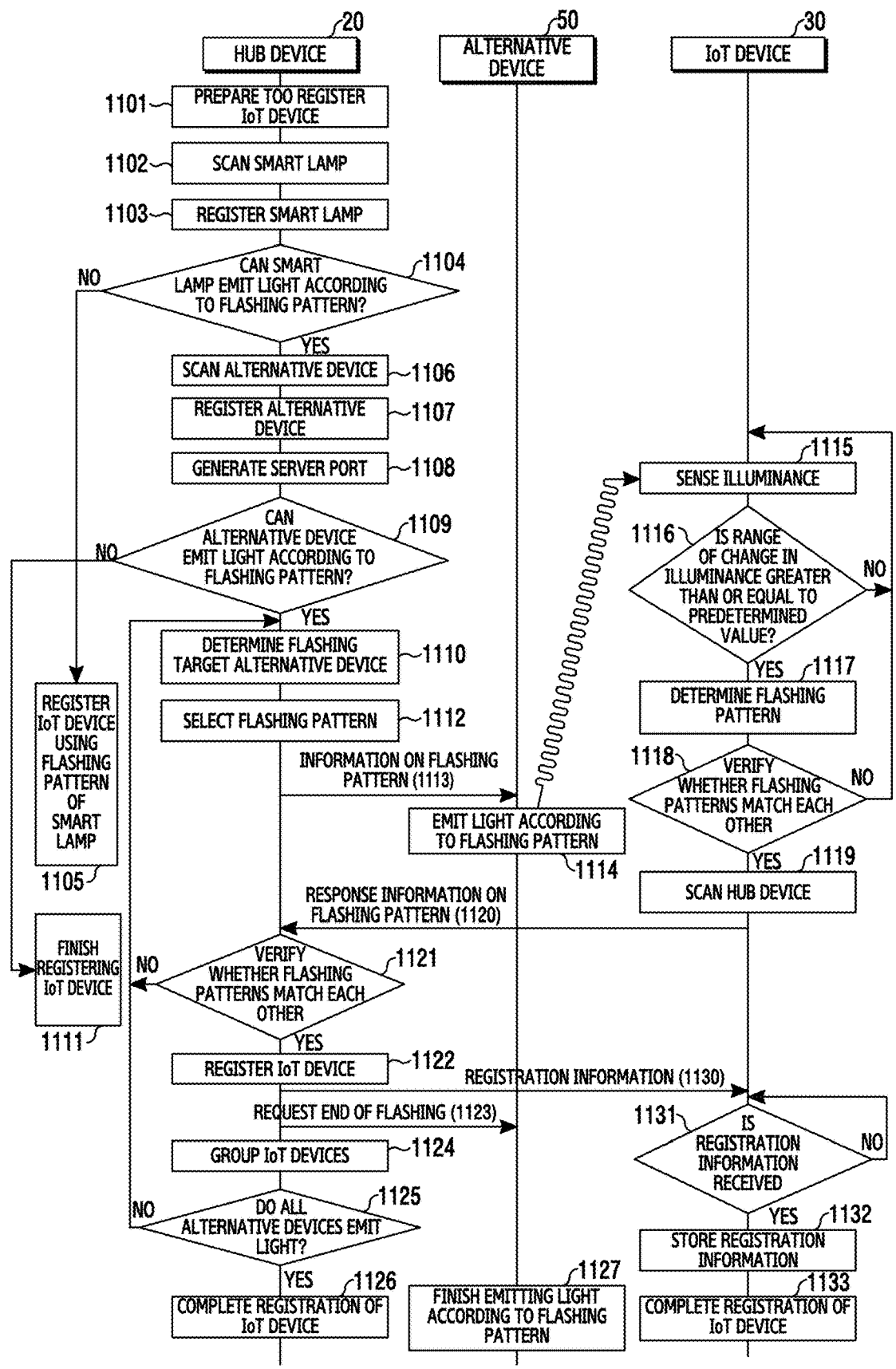

FIG. 11 illustrates a flowchart showing a process of the hub device 20 registering the IoT device 30 according to still another exemplary embodiment of the present disclosure.

According to one embodiment, in an environment in which the smart lamp 10 of FIG. 1A is not provided, the user may wish to register the IoT device 30 at the hub device 20 using a flashing pattern method.

To achieve this, a method for registering the IoT device 30 at the hub device 20 using a smart TV, a normal light emitting device (for example, a household lamp, a lamp, or the like), or devices provided with a light emitting device, which perform the role of the smart lamp 10, may be provided.

Referring to FIG. 11, the hub device 20 may be prepared to register the IoT device 30 (1101).

When the registration of the IoT device 30 is prepared, the hub device 20 may scan at least one smart lamp 10 located nearby (1102). In addition, the hub device 20 may register the scanned smart lamp 10 (1103).

Next, the hub device 20 may determine whether the registered smart lamp 10 can emit light according to a flashing pattern according to the present disclosure (1104).

When the smart lamp 10 can emit light according to the flashing pattern (YES of 1104), the hub device 20 may register the IoT device 30 using the flashing pattern of the smart lamp 10 as described above with reference to FIGS. 6 to 9 (1105).

On the other hand, when the smart lamp 10 cannot emit light according to the flashing pattern (NO of 1104), the hub device 20 may scan an alternative device 50 which can emit light according to the flashing pattern (1106). In addition, the hub device 20 may register the scanned alternative device 50 (1107). The alternative device 50 may be any kind of device which has a light emitting device and can communicate with the hub device 20.

The alternative device may be a smart TV, an electronic album, a camera, or a mobile phone. Alternatively, the alternative device may be a normal lamp which is mounted into an IoT power outlet and is controlled to be turned on/off. In this case, the IoT power outlet may turn on/off the normal lamp according to an input pattern.

Next, the hub device 20 may generate a server port (1108). In addition, the hub device 20 may determine whether the alternative device 50 can emit light according to the flashing pattern (1109).

When the alternative device 50 can emit light according to the flashing pattern (YES of 1109), the hub device 20 may determine the alternative device 50 as a target to flash (1110). For example, the hub device 20 may determine the alternative device 50 to be the target to flash in sequence according to an order of registration of the plurality of alternative devices 50 or a distance to each of the plurality of alternative devices 50. On the other hand, when the alternative device 50 does not emit light according to the flashing pattern (NO of 1109), the hub device 20 may finish registering the IoT device 30 (1111).

When the alternative device 50 to be the target to flash is determined, a flashing pattern of light to be flashed by the alternative device 50 may be selected (1112). When the flashing pattern is selected, the hub device 20 may transmit a signal including information on the selected flashing pattern to the alternative device 50 (1113).

In response to the received signal, the alternative device 50 may emit light according to the selected flashing pattern (1114). When the alternative device 50 flashes and also emit light in various colors, the color of the flashing light may be included as a part of the flashing pattern.

When the alternative device 50 emits light, the IoT device 30 which senses illuminance in the same location as the alternative device 50 may be registered at the hub device 20 based on the flashing pattern. Since operations 1115 to 1122 according to these operations correspond to operations 610 to 617 of FIG. 6, operations 1130 to 1133 correspond to operations 630 to 633 of FIG. 6, and operations 1126 to 1127 according to these operations correspond to operations 622 and 619 of FIG. 6, a detailed description thereof is omitted.

The hub device 20 which registers the IoT device 30 may transmit, to the alternative device 50, a signal for requesting the end of the flashing of a light emitting device provided in the alternative device 50 (1123).

When the hub device 20 receives signals including response information on a plurality of flashing patterns from the plurality of IoT devices 30, the hub device 20 may group the IoT devices 30 which have transmitted signals including response information on the same flashing pattern, and store the grouped IoT devices 30 (1124).

Next, the hub device 20 may determine whether all of the alternative devices 50 registered in operation 1107 emit light according to the flashing pattern (1125). When all of the alternative devices 50 emit light according to the flashing pattern (YES of 1125), the hub device 20 may complete the registration of the IoT device 30. On the other hand, when all of the alternative devices 50 do not emit light according to the flashing pattern (NO of 1125), the hub device 20 may determine another alternative device 50 as a flashing target device in sequence.

FIGS. 12A to 13E illustrate views schematically showing a process of a hub device 1220 registering an IoT device 1230 according to an exemplary embodiment of the present disclosure. In the following description, the hub device 1220, the IoT device 1230, and a user device 1240 may be similar to or the same as the hub device 20, the IoT device 30, and the user device 40 shown in FIG. 1A at least in part. In the following description, IoT devices 1230-1 to 1230-4 may be similar to or the same as the IoT devices 30-1 to 30-4 shown in FIG. 1B at least in part.

Figure 12A:
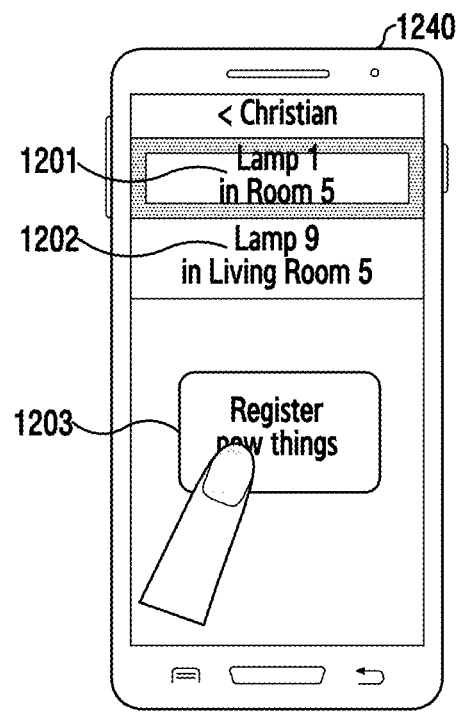
FIGS. 12A to 13E illustrate views schematically showing a process of a hub device registering an IoT device according to various exemplary embodiments of the present disclosure.

Referring to FIG. 12A, the user device 1240 may execute a managing application to register the IoT device 1230 based on user's input information. In this case, identification information 1201, 1202 of a smart lamp 1210 already registered at the user device 1240 and a registration UI 1203 for registering new IoT devices 1230 may be provided on the screen of the user device 1240.

Figure 12B:
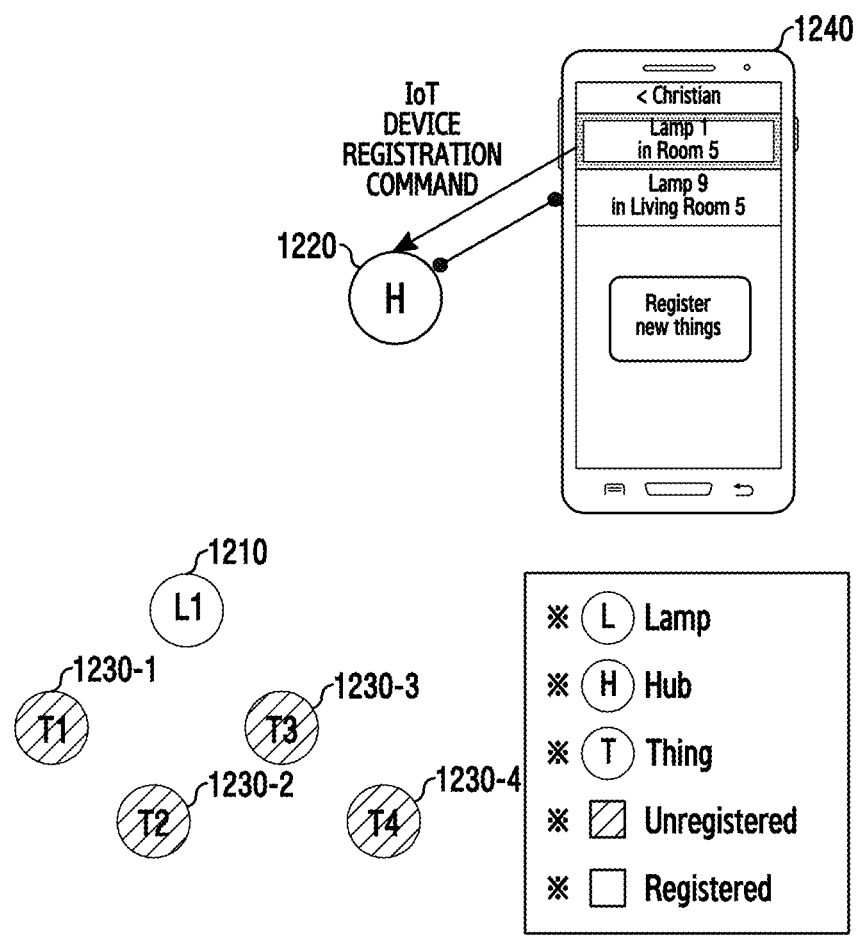

In this case, in response to a user input of selecting one piece of identification information 1201 of the smart lamp 1210 and the registration UI 1203, which are displayed on the screen of the user device 1240, the user device 1240 may transmit a command to register the IoT device 1230 to the hub device 1220 as shown in FIG. 12B. In view FIG. 12B, the smart lamp 1210 which is not shaded may be a smart lamp which is already registered at the hub device 1220, and the IoT devices 1230-1 to 1230-4 which are shaded may be IoT devices which are not registered at the hub device 1220. The shaded IoT devices 1230-1 to 1230-4 may be in a factory initial state, for example.

In this case, the user device 1240 which intends to register the new IoT devices 1230-1 to 1230-4 is not necessarily located in the same space as the IoT devices 1230-1 to 1230-4 or the smart lamp 1210.

Figure 12C:
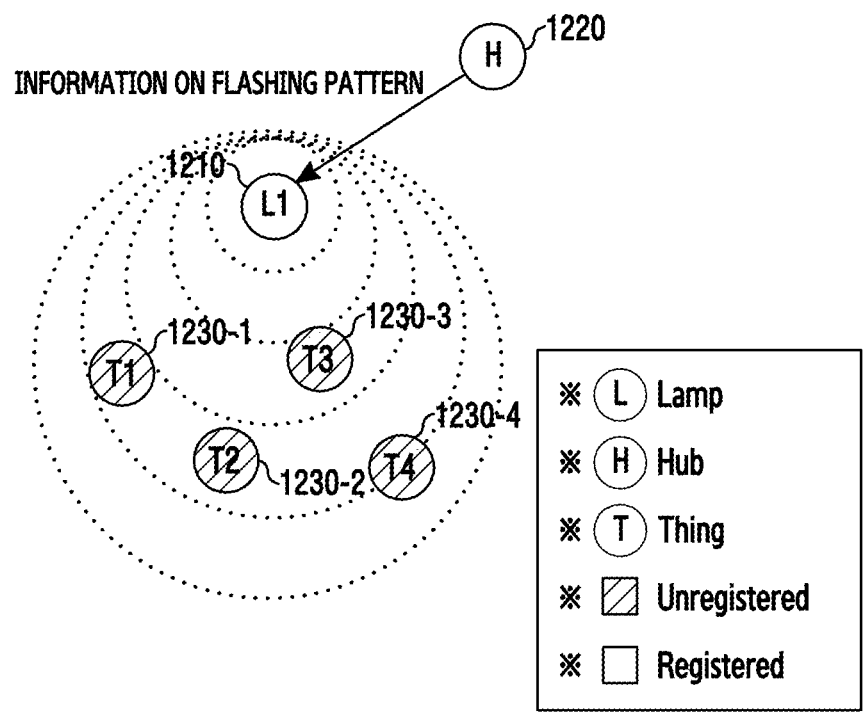

The hub device 1220 which receives the registration command from the user device 1240 may transmit a signal including information on a flashing pattern to the smart lamp 1210 as shown in FIG. 12C.

In response to the received signal, the smart lamp 1210 may emit light several times (about five times) according to the flashing pattern. The number of times the smart lamp 1210 emit light according to the flashing pattern may also be provided by the hub device 1220.

Figure 12D:
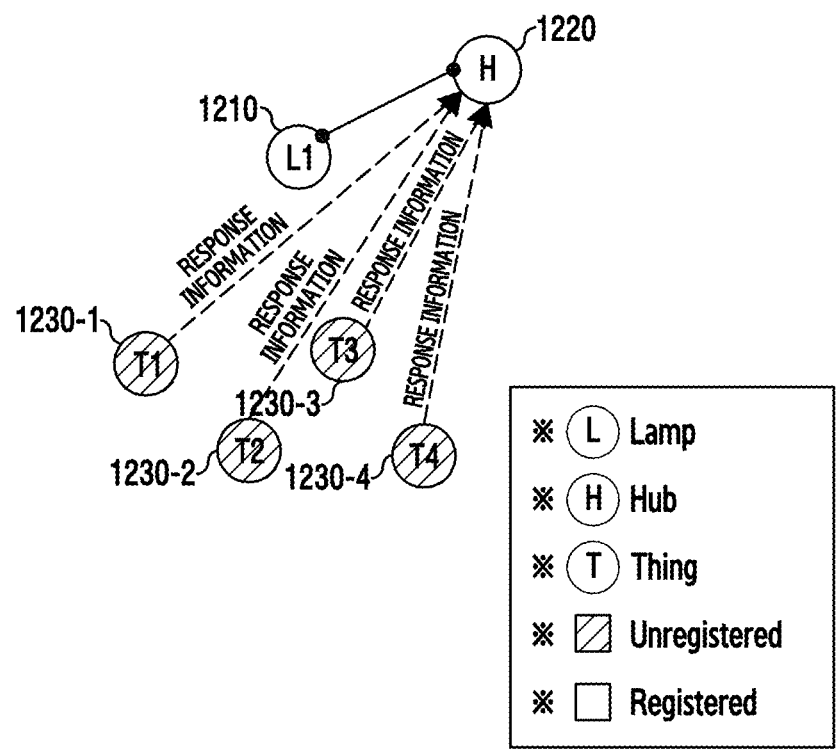

When the smart lamp 1210 emits light, the IoT devices 1230-1 to 1230-4 may sense illuminance. The IoT devices 1230-1 to 1230-4 may determine the flashing pattern of the smart lamp 1210 based on illuminance data. In addition, the IoT devices 1230-1 to 1230-4 may transmit a signal including response information on the determined flashing pattern to the hub device 1220 as shown in FIG. 12D.

The hub device 1220 which receives the signal including the response information on the flashing pattern may determine whether the received response information is appropriate. For example, the hub device 1220 may determine whether the flashing pattern included in the response information matches a flashing pattern method for registering the IoT device 1230. When the response information is appropriate as a result of the determining, the hub device 1220 may register the IoT devices 1230-1 to 1230-4.

Figure 12E:
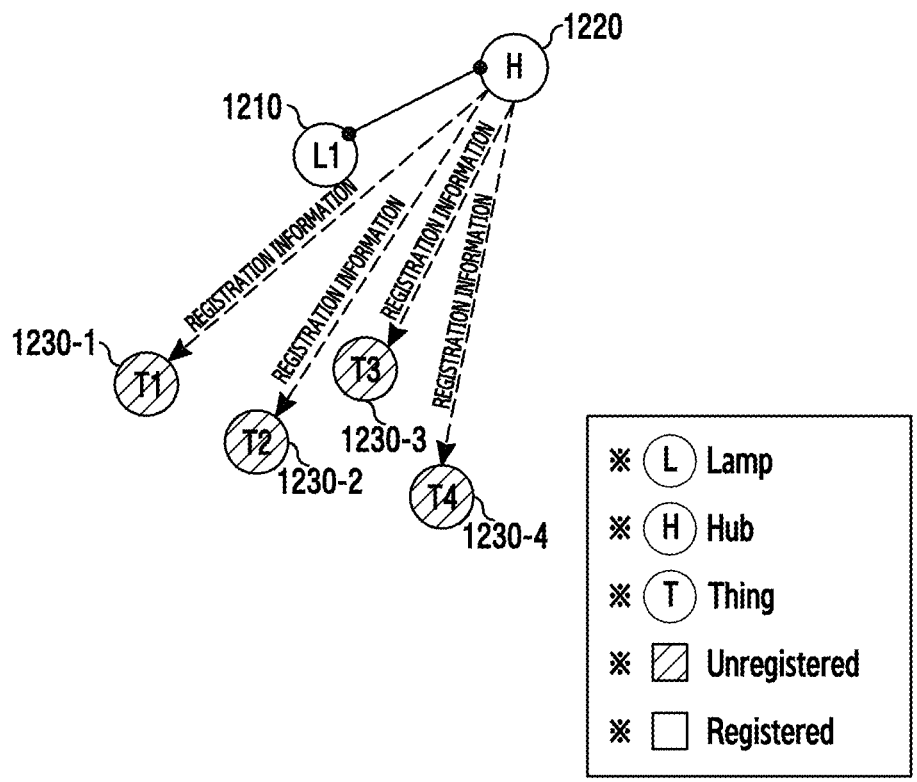

In addition, as shown in FIG. 12E, the hub device 1220 may transmit registration information informing that the IoT device 1230 is registered to the IoT devices 1230-1 to 1230-4. In this case, the registration information may include location information of the IoT devices 1230-1 to 1230-4 and identification information of the IoT devices 1230-1 to 1230-4 for distinguishing the IoT devices 1230-1 to 1230-4 from one another. For example, the location information of the IoT devices 1230-1 to 1230-4 may be location information of the smart lamp 1210 which emits light toward the IoT devices 1230-1 to 1230-4 according to the flashing pattern, or identification information of the smart lamp 1210. The location information and the identification information of the IoT devices 1230-1 to 1230-4 may use names which are pre-stored in the hub device 1220, and, when there is no name pre-stored, may use names which are arbitrarily or randomly generated according to a specified rule.

Figure 12F:
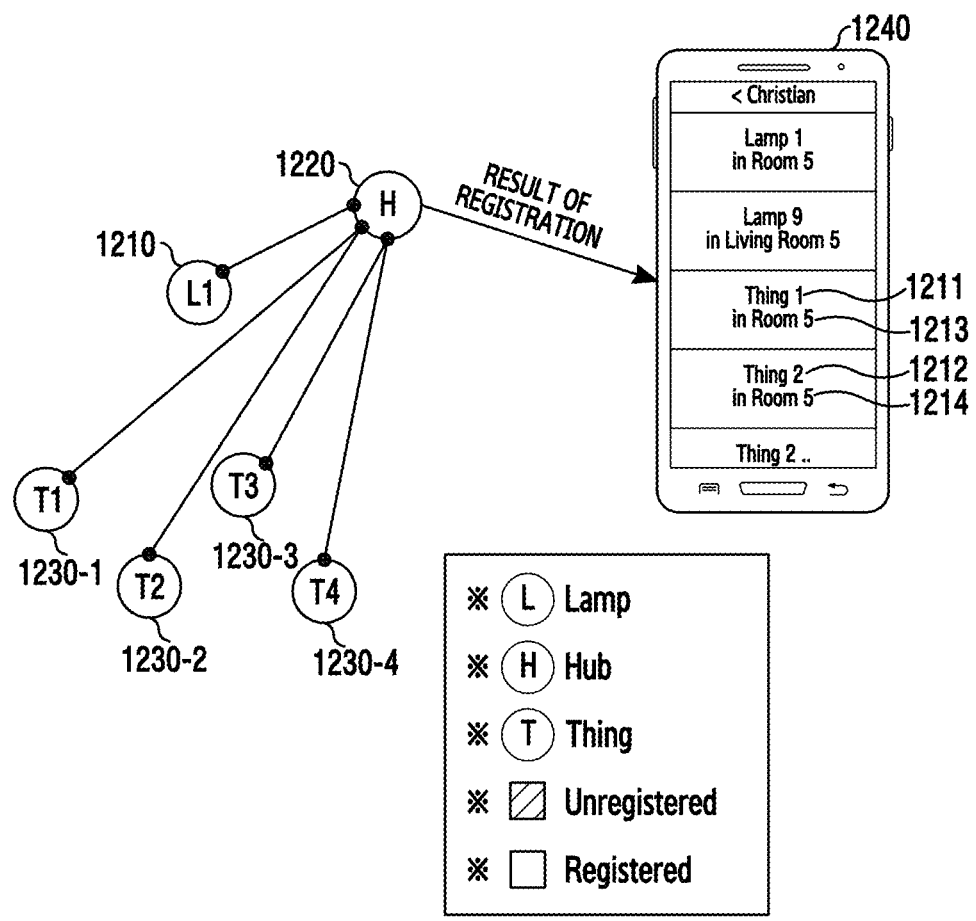

The IoT devices 1230-1 to 1230-4 which receive the registration information may store the received registration information. Accordingly, a communication connection (for example, a pairing connection) may be performed between the IoT devices 1230-1 to 1230-4 and the hub device 1220 as shown in FIG. 12F. Next, the hub device 1220 may transmit the result of the registration of the IoT devices 1230-1 to 1230-4 to the user device 1240 as shown in FIG. 12F. The result of the registration may include the identification information and the location information of the registered IoT devices 1230-1 to 1230-4.

The user device 1240 may display identification information 1211, 1212 and location information 1213, 1214 of at least one of the newly registered IoT devices 1230-1 to 1230-4. For example, in FIG. 12F, the identification information of the newly registered IoT devices 1230-1, 1230-2 are "Thing 1" and "Thing 2," and the location information is "Room 5" since the IoT devices 1230-1, 1230-2 are registered with reference to the same smart lamp 1210. In this case, when the user wishes to change information (for example, identification information) of at least one of the newly registered IoT devices 1230-1 to 1230-4, the user may select identification information and manually change the selected identification information. For example, the user may change the name of the identification information of at least one of the IoT devices 1230-1 to 1230-4 to another name that the user can easily know.

According to another exemplary embodiment, the user may wish to delete at least one of the registered IoT devices 1230-1 to 1230-4. In this case, the user may select at least one IoT device 1230 that the user wishes to delete on the screen provided by the managing application, and execute a delete function. In this case, the user device 1240 may transmit a command to unregister the selected IoT device 1230-1 to the hub device 1220. The hub device 1220 which receives the unregistration command may forward the unregistration command to the IoT device 1230. The IoT device 1230 which receives the unregistration command may delete the registration information which is being stored. For example, the IoT device 1230 may delete the identification information of the hub device 1220 or the location information of the IoT device 1230.

FIGS. 13A to 13E illustrate views schematically showing a process of a hub device 20 registering an IoT device 30 according to another exemplary embodiment of the present disclosure. For example, as described above in the flowchart of FIG. 10, a user may register the IoT device 30 using a light emitting device of a user device 40.

Figure 13A:
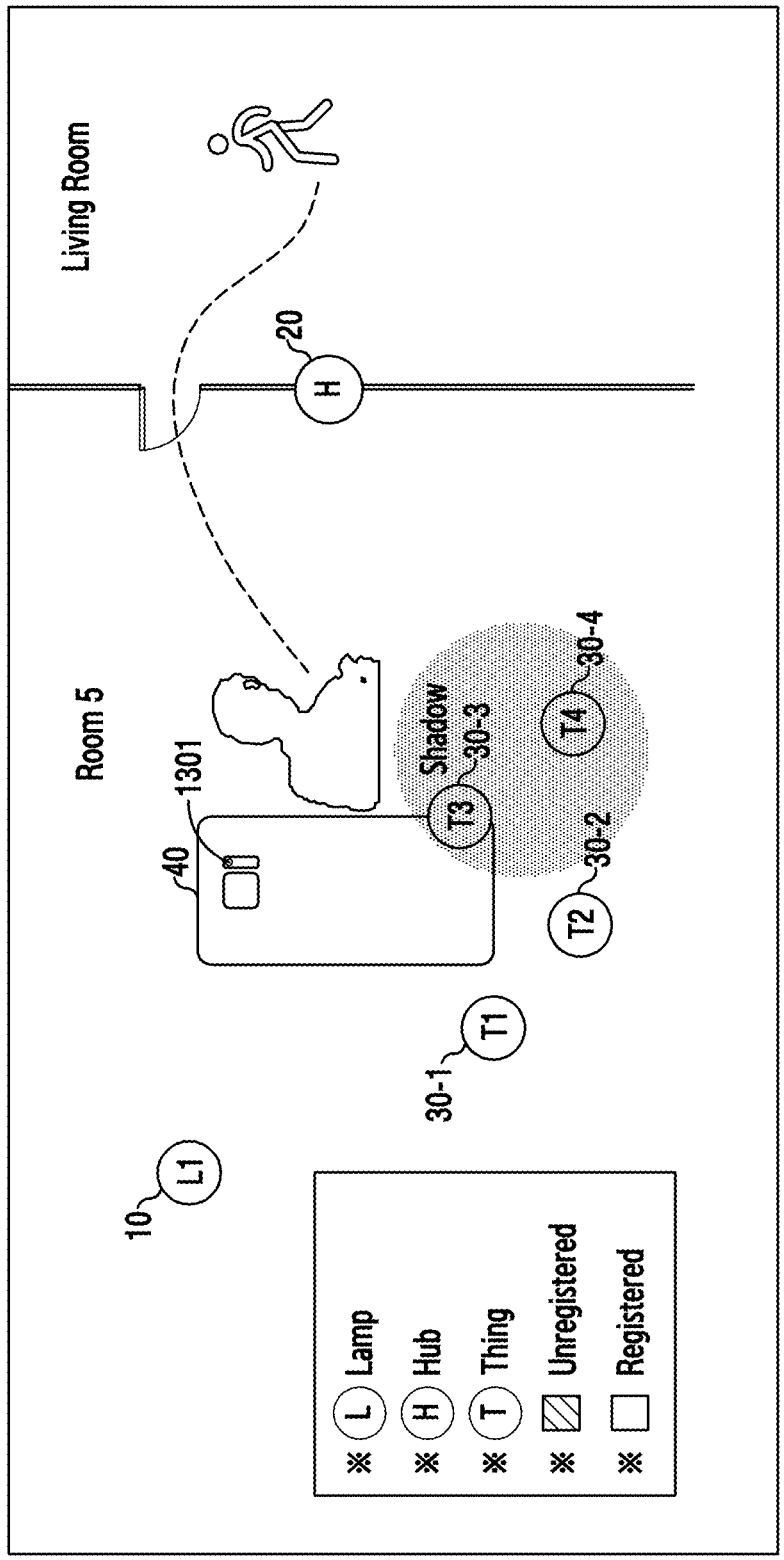

Referring to FIG. 13A, the user may wish to register IoT devices 30-3 and 30-4 which are not registered from among the IoT devices 30-1 to 30-4 located in a specific space (for example, Room 5). In this case, the unregistered IoT devices 30-3 and 30-4 may be located in a shadow region where the illuminance of light emitted by a smart lamp 10 is not sensed (for example, the IoT devices mounted into a socket behind furniture), and thus may be unregistered.

In this case, the user may move to the location of the unregistered IoT devices 30-3 and 30-4.

Figure 13B:
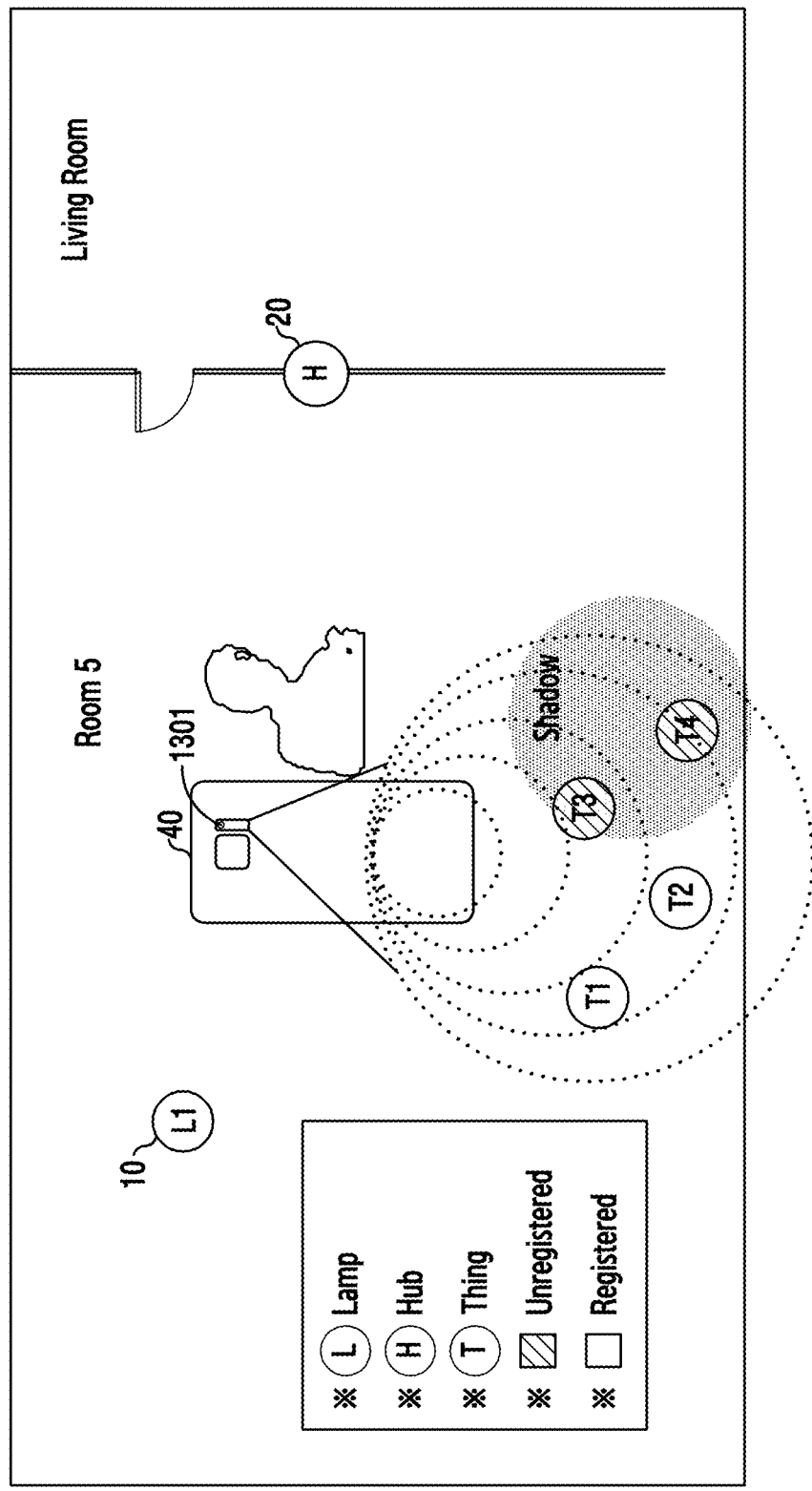

Next, referring to FIG. 13B, the user may execute a managing application to newly register the IoT devices 30-3 and 30-4, and control a light emitting device 1301 provided in the user device 40 to emit light according to a flashing pattern. Accordingly, the light emitting device 1301 of the user device 40 may emit light several times (for example, about five times) according to the flashing pattern. Alternatively, the user device 40 may receive information on the flashing pattern from the hub device 20. In addition, the light emitting device 1301 of the user device 40 may emit light several times according to the received flashing pattern.

When the light emitting device 1301 emits light, the IoT devices 30-3 and 30-4 may sense illuminance and determine the flashing pattern based on the illuminance.

Figure 13C:
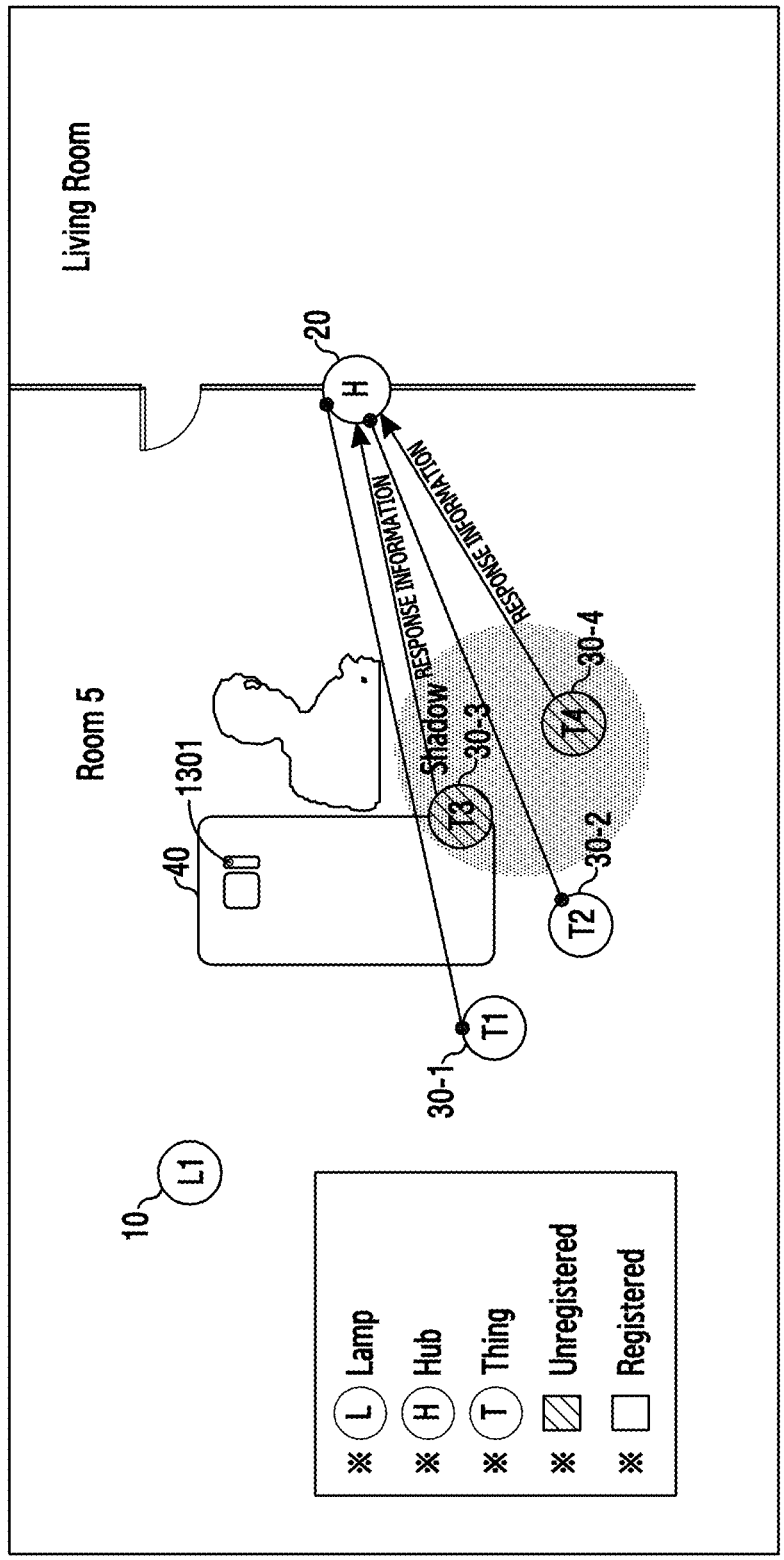

Next, as shown in FIG. 13C, the IoT devices 30-3 and 30-4 may transmit a signal including response information on the determined flashing pattern to the hub device 20. In this case, the IoT devices 30-1 and 30-2 which are already registered at the hub device 20 and are connected thereto for communication may disregard the flashing pattern, and only the unregistered IoT devices 30-3 and 30-4 may transmit the response information to the hub device 20.

Figure 13D:
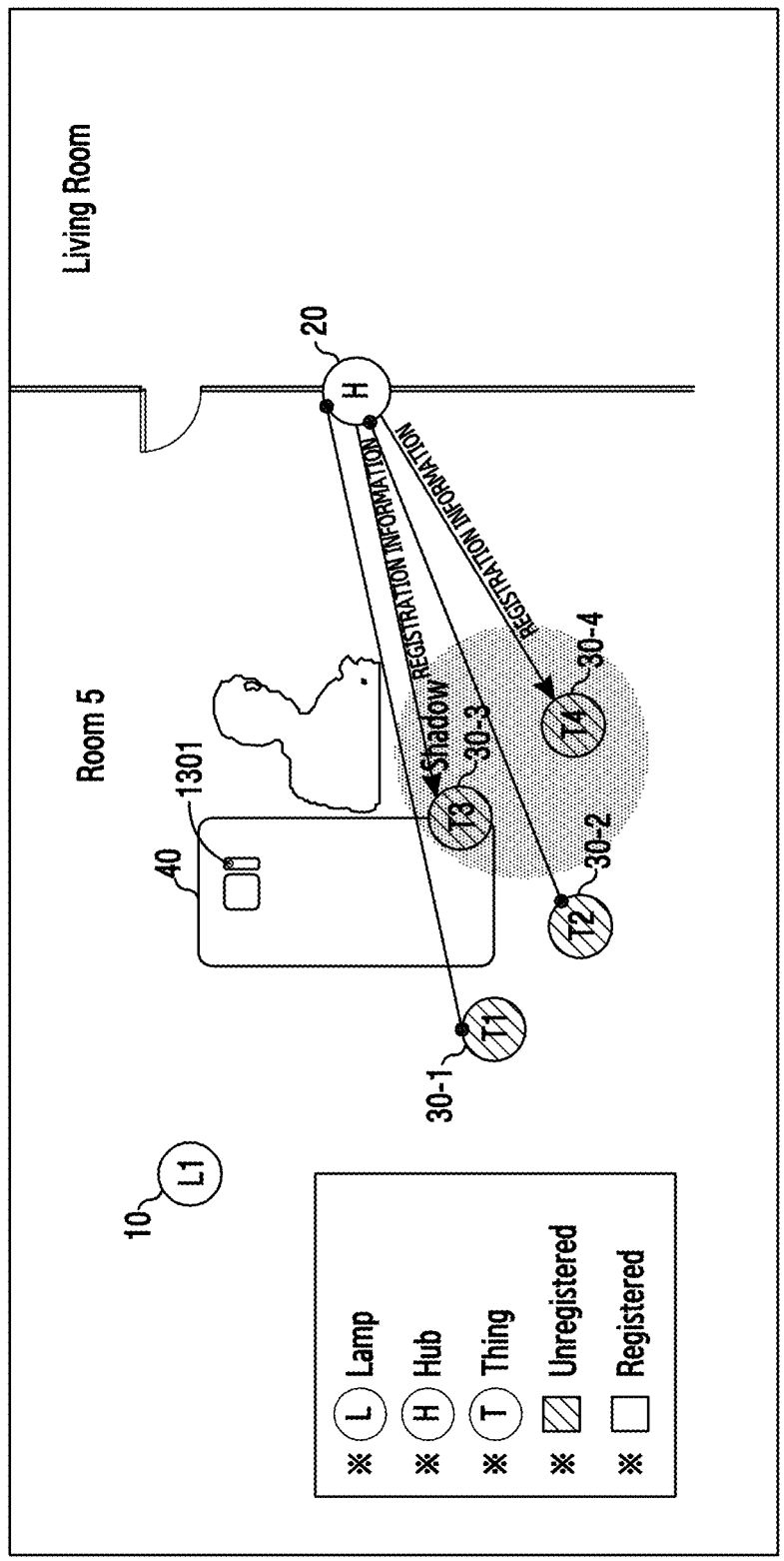

The hub device 20 which receives the signal including the response information on the flashing pattern from the unregistered IoT devices 30-3 to 30-4 may determine whether the received response information is appropriate or not. When the response information is appropriate as a result of the determining, the hub device 20 may register the IoT devices 30-3 and 30-4. In addition, as shown in FIG. 13D, the hub device 20 may transmit registration information informing that the IoT device 30 is registered to the IoT devices 30-3 and 30-4. For example, the registration information may include location information of the IoT devices 30-3 and 30-4. The location information of the IoT devices 30-3 and 30-4 may be location information or identification information of the user device 40 which emits light toward the IoT devices 30-3 and 30-4 according to the flashing pattern. For example, the location information of the user device 40 may be generated based on location information (for example, GNSS information or GPS information) which is sensed by the user device 40.

Figure 13E:
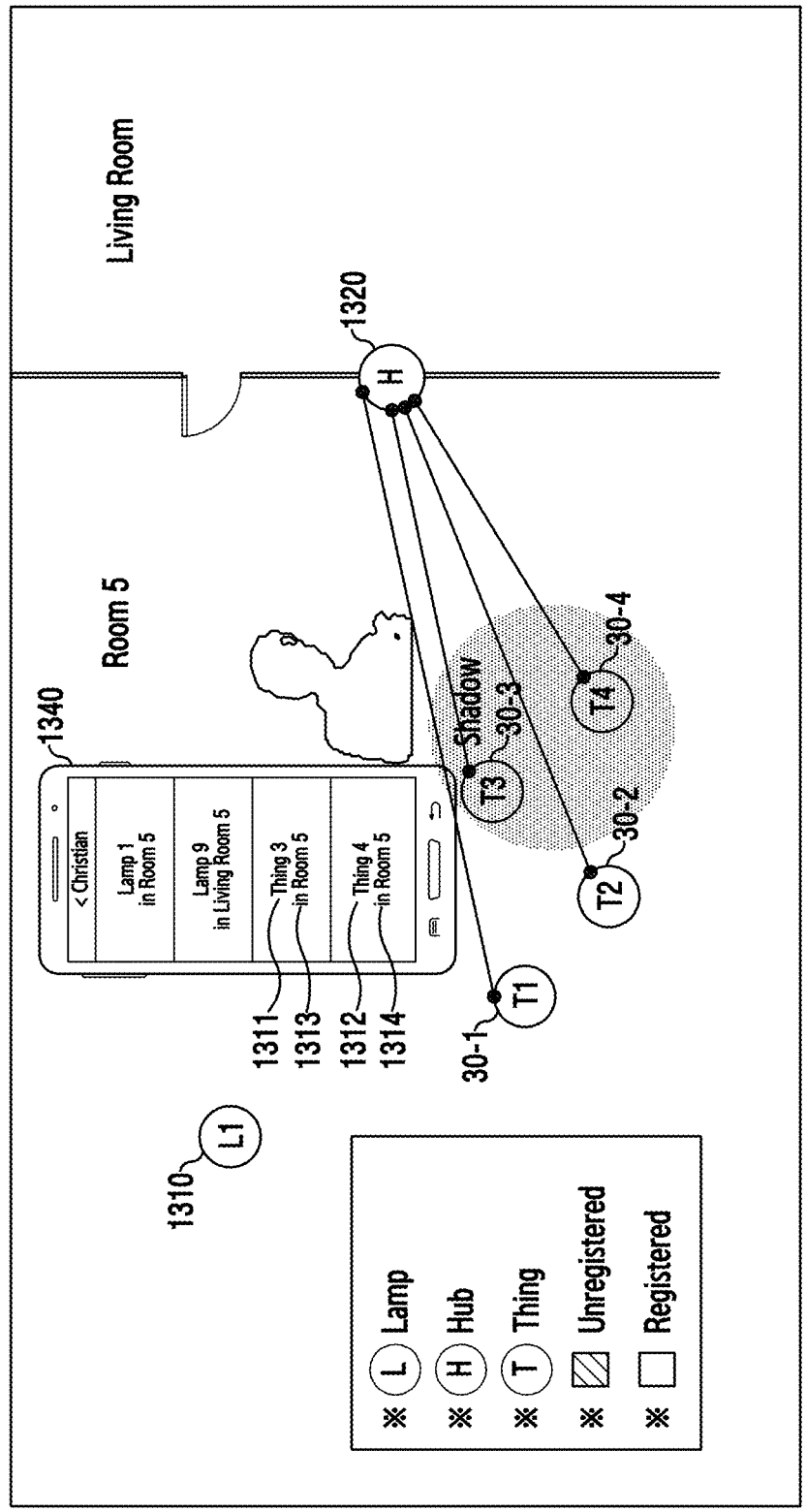

The IoT devices 30-3 and 30-4 which receives the registration information may store the received registration information. Accordingly, a communication connection may be performed between the IoT devices 30-1 and 30-4 and the hub device 20 as shown in FIG. 13E. When the communication connection is performed, the user device 40 may display identification information 1311, 1312 and location information 1313, 1314 of the additionally registered IoT devices 30-3 and 30-4 on the screen.

FIGS. 14A to 14D illustrate views showing screens of the user device for registering the IoT devices 30.

According to an exemplary embodiment of the present disclosure, the registration state of the smart lamps 10 and the IoT devices 30 may be provided through the screen of the user device 40.

For example, the user device 40 may communicate with the hub device 20 and may display the registration state of the smart lamps 10 and the IoT devices 30 on the screen. Alternatively, when the user device 40 performs the role of the hub device 20, the user device 40 may display the registration state of the smart lamps 10 and the IoT devices 30 performed in the user device 40 on the screen.

Figure 14A:
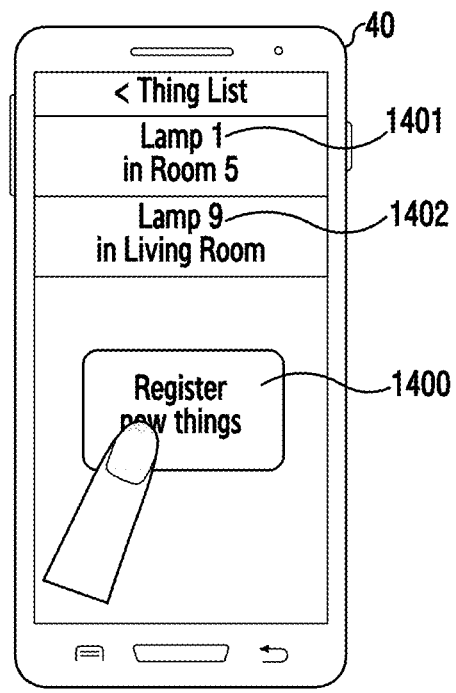
FIGS. 14A to 14D illustrate views showing screens of a user device which registers IoT devices according to various exemplary embodiments of the present disclosure.

As shown in FIG. 14A, the user device 40 may provide a screen including identification information 1401, 1402 of the already registered smart lamps 10. In this case, a UI 1400 for requesting registration of a new IoT device 30 may be displayed on the screen.

Figure 14B:
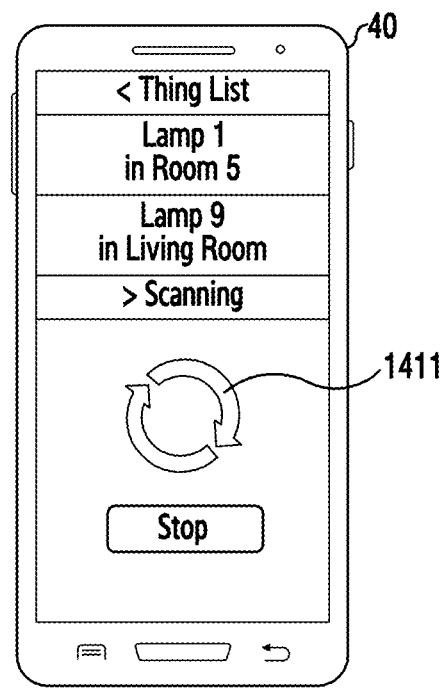

In response to a user input of selecting the UI 1400, the user device 40 may display visual feedback 1411 indicating that a new smart lamp 10 is being scanned on the screen as shown in FIG. 14B.

Figure 14C:
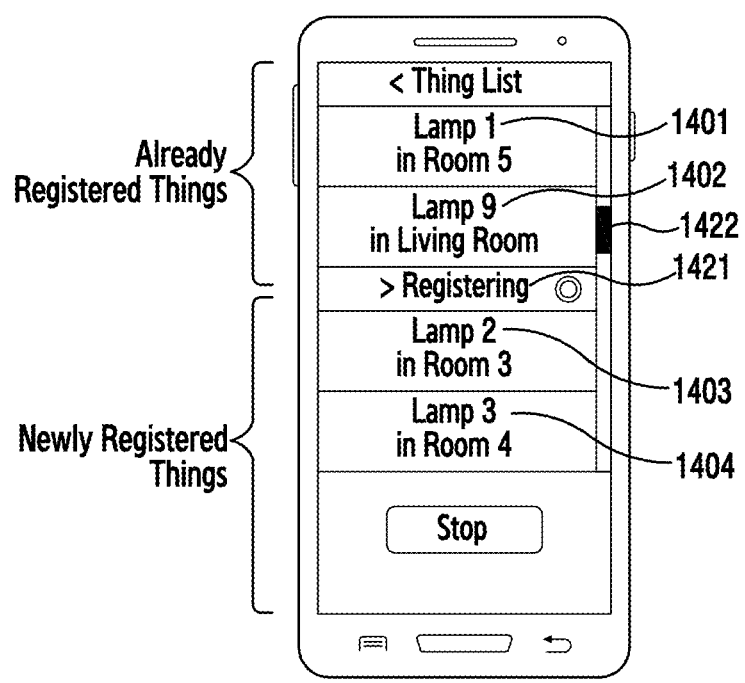

When the new smart lamp 10 is scanned, the user device 40 may display identification information 1403, 1404 of the newly registered smart lamps 10 on the screen in addition to the identification information 1401, 1402 of the already registered smart lamps 10 as shown in FIG. 14C. In addition, the user device 40 may display visual feedback 1421 indicating that the IoT devices 30 are being registered based on light emission of the scanned smart lamps 10 on the screen. In this case, when there are more scanned smart lamps 10, the user may drag a scroll bar 1422 such that other scanned smart lamps 10 are displayed on the screen.

Figure 14D:
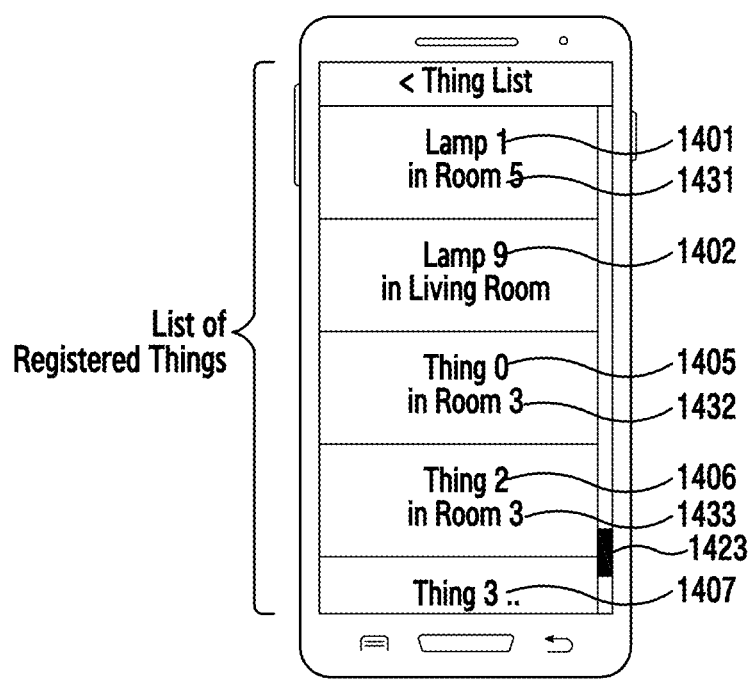

When the registration of the IoT device 30 is completed based on the light emission of the newly registered smart lamps 10, the user device 40 may display identification information 1405, 1406, 1407 of the newly registered IoT devices 30 on the screen as shown in FIG. 14D. For example, when the registration of the new IoT devices 30 at the hub device 20 is completed, the hub device 20 may transmit the result of the registration including the identification information 1405, 1406, 1407 of the registered IoT devices 30 to the user device 40. Accordingly, the user device 40 may additionally display the identification information 1405, 1406, 1407 of the newly registered IoT devices 30 on the screen. When there are more newly registered IoT devices 30 in FIG. 14D, the user may drag a scroll bar 1423, such that the identification information of other newly registered IoT devices 30 is displayed on the screen.

In this case, the newly registered IoT devices 30 may be grouped and displayed on the screen. For example, the IoT devices 30 registered based on the same flashing pattern may be grouped and displayed on the screen. In this case, as identification information indicating grouping, the identification information of the smart lamp 10 providing the same flashing pattern, or identification information 1432, 1433 of the location of the smart lamp 10 (for example, room 3) may be used. In this case, the identification information of the location may be automatically assigned to the smart lamp 10 in the hub device 20, or may be assigned according to a user input via the user device 40.

As described above, the user can simply register the plurality of IoT devices 30 existing in the same space, simultaneously, by trying to register in a single time, and can be provided with the result of the registration via the screen of the user device 40.

The smart lamp 10 for registering the IoT devices 30 may be required to flash according to a flashing pattern distinct from a normal light emitting pattern. For example, the flashing pattern of the smart lamp 10 may be determined in consideration of a change in brightness of other neighbor lamps or illuminance according to the on/off state of lamps.

The flashing pattern may be determined by the hub device 20 and transmitted to the smart lamp 10. Alternatively, when the flashing pattern is generated in the user device 40 and transmitted to the hub device 20, the hub device 20 may transmit the flashing pattern to the smart lamp 10. When the smart lamp 10 emits light in response to the flashing pattern, the IoT devices 30 may sense ambient illuminance and determine the flashing pattern based on illuminance data.

Figure 15A:
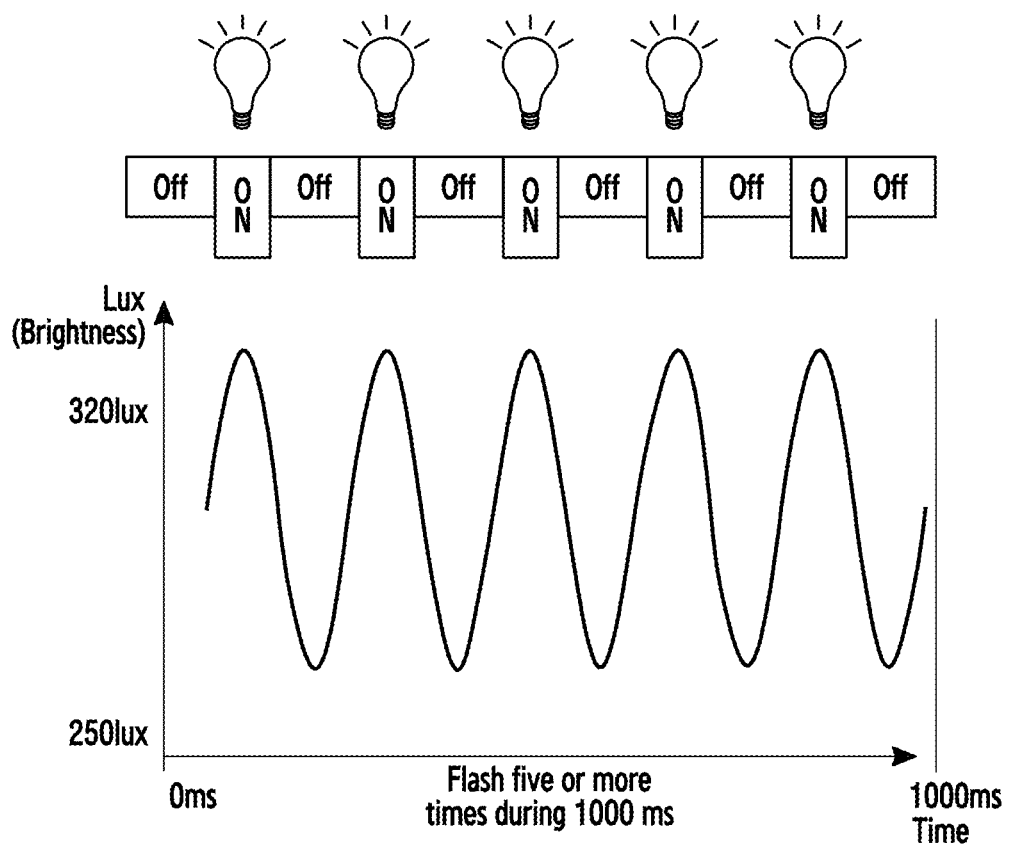
FIGS. 15A to 15C illustrate views showing various flashing patterns according to various exemplary embodiments of the present disclosure.
Figure 15B:
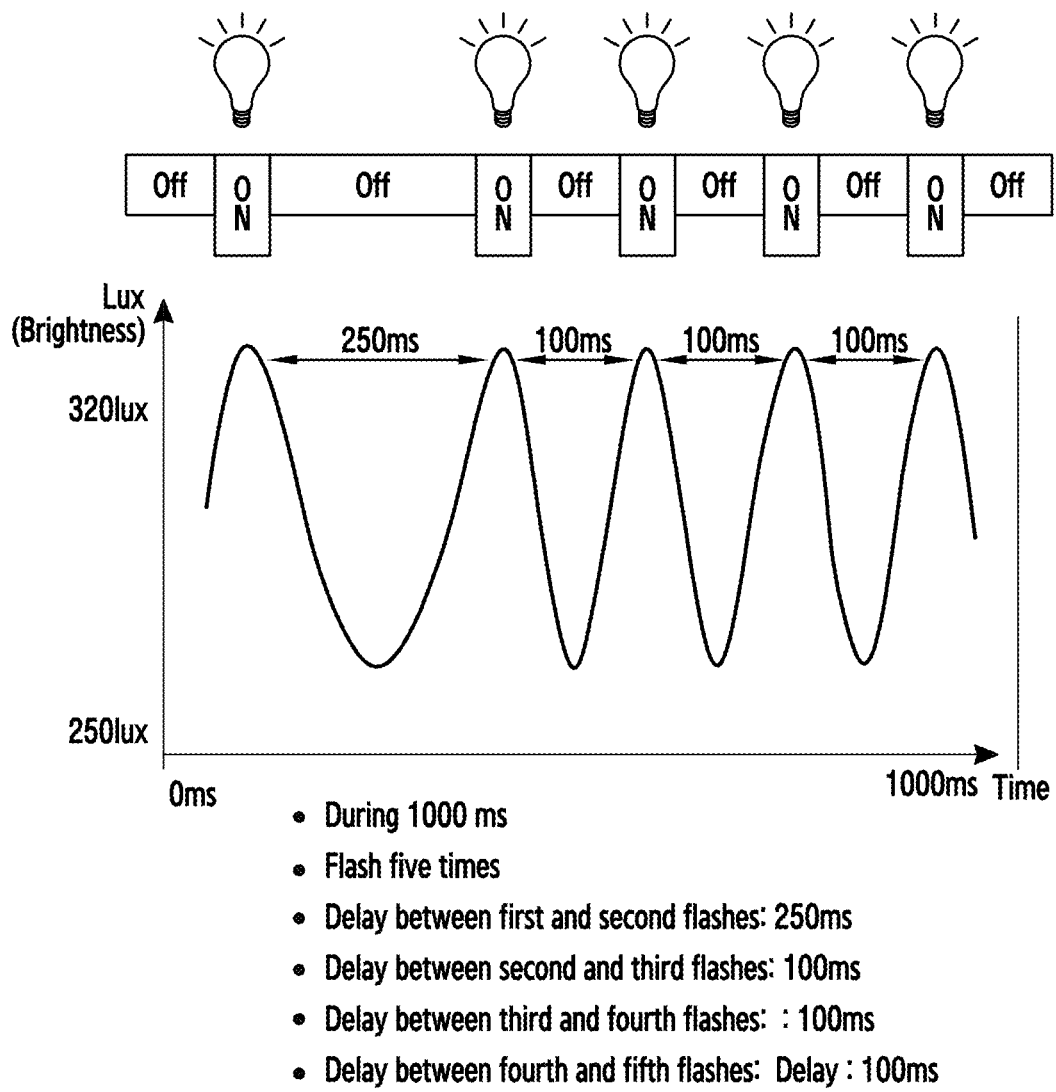
Figure 15C:
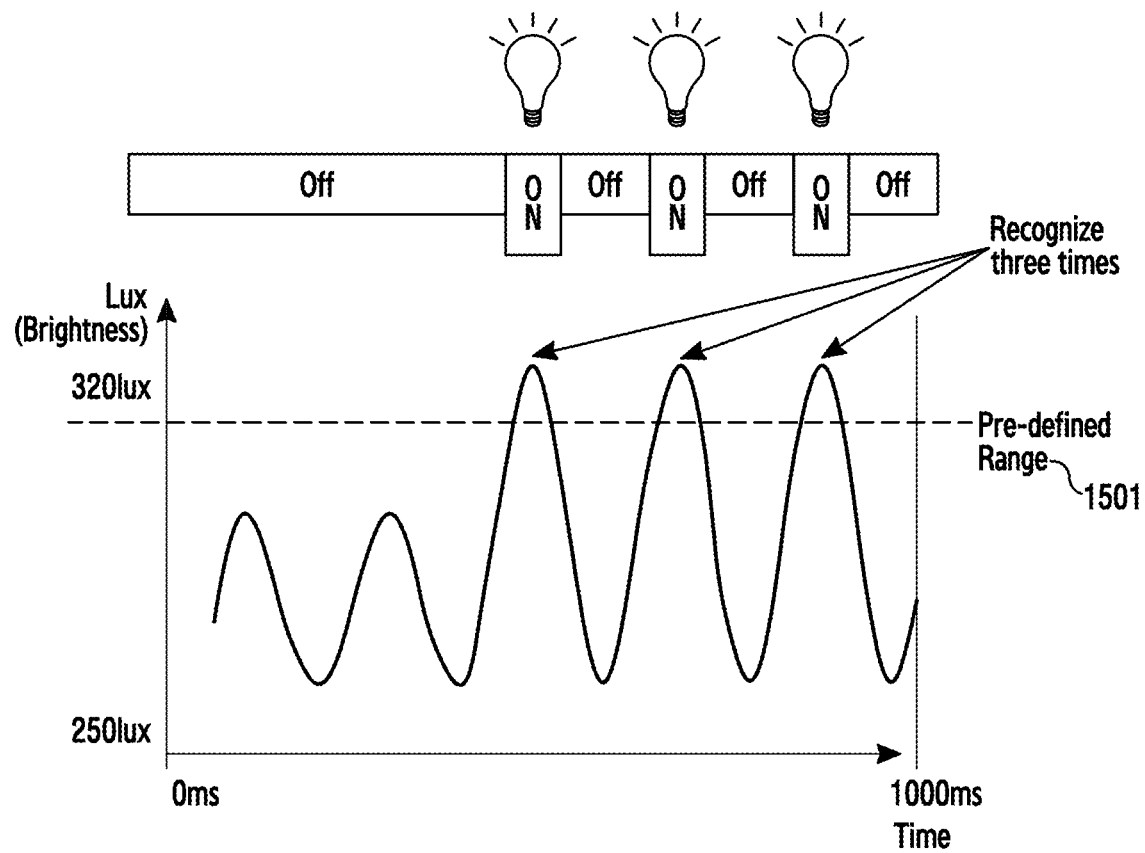

FIGS. 15A to 15C illustrate views showing various flashing patterns which are determined based on illuminance sensed in the IoT device 30 according to an exemplary embodiment of the present disclosure.

For example, in FIG. 15A, the flashing pattern may be a pattern in which light is emitted more than a predetermined number of times (for example, three to ten times) during hundreds of milliseconds (for example, 300 to 700 ms).

In another example, as shown in FIG. 15B, the flashing pattern may be a pattern in which light is emitted with a different amplitude or a different phase in each cycle of a frequency. For example, when light flashes five times during 1000 ms, a cycle section between the first flash and the second flash may have a delay of 250 ms, and cycle sections between the second flash and the fifth flash may have a delay of 100 ms. In this case, the IoT device 30 may reply to the hub device 20 with the number of times of flashing during a predetermined time and an amplitude or a phase in each flashing cycle as information on the flashing pattern.

In another example, a plurality of flashing patterns may overlap with one another as shown in FIG. 15C. For example, a distance between the smart lamps 10 may be short and thus flashing light of the smart lamps 10 may interfere with one another. Accordingly, the plurality of flashing patterns may overlap with one another.

In this case, the IoT device 30 may determine a flashing pattern in which a range of a change in illuminance exceeds a pre-defined range 1501 as the flashing pattern for registering the IoT device 30.

For example, when light flashes five times during 1000 ms, the flashing patterns overlap one another and thus the initial two flashes may have the range of the change in the illuminance lower than the pre-defined range 1501. The next three flashes may have the range of the change in the illuminance greater than or equal to the pre-defined range 1501. In this case, the IoT device 30 may give priority to the flashing pattern of the next three flashes which exceeds the pre-defined range 1501 and determine this flashing pattern as the flashing pattern for registering the IoT device 30.

According to various exemplary embodiments, the color of light emitted by the smart lamp 10 may be used as the flashing pattern. In this case, the IoT device 30 may identify the color of emitted light based on illuminance data.

The IoT device 30 may extract red (R), green (G), black (B), white (W) values from the illuminance data. The IoT device 30 may determine the color of emitted light based on a ratio of the extracted R, G, B, and W values.

For example, when the R, G, B, and W values are 231, 197, 228, and 592, respectively and a brightness value is 344, the IoT device 30 may determine the color of emitted light as pink. In another example, when the R, G, B, and W values are 26, 19, 20, and 61, respectively and a brightness value is 36, the IoT device 30 may determine the color of emitted light as pink. In another example, when R, G, B, and W values are 342, 263, 304, and 828 and a brightness value is 344, the IoT device 30 may determine the color of emitted light as white.

Figure 16:
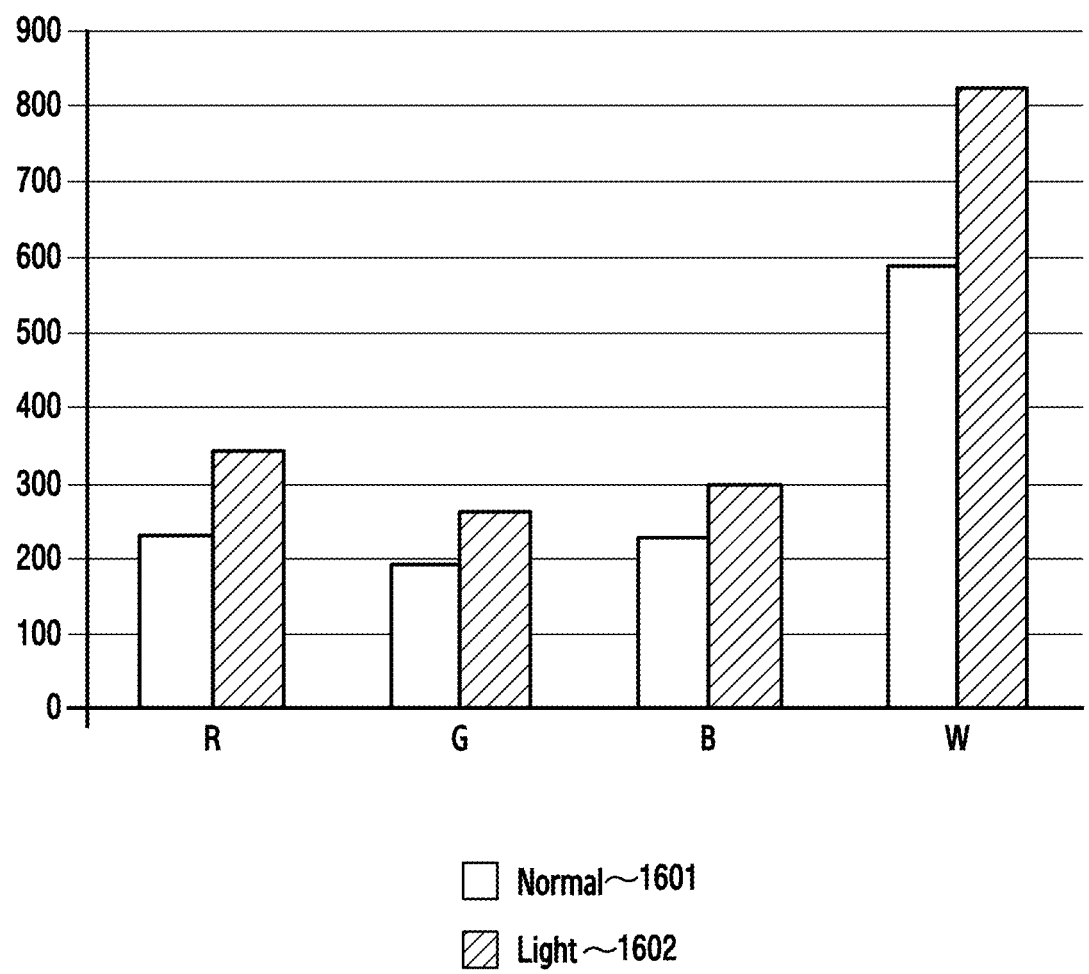
FIG. 16 illustrates a graph showing illuminance data according to various exemplary embodiments of the present disclosure.

FIG. 16 is a graph showing illuminance data which is analyzed in the IoT device 30 according to an exemplary embodiment.

The graph of FIG. 16 shows brightness values of R, G, B, and W extracted from illuminance data. In FIG. 16, bars 1601 may indicate brightness values of R, G, B, and W which are sensed by the IoT device 30 in a normal environment, and bars 1602 may indicate brightness values of R, G, B, and W which are sensed by the IoT device 30 when the smart lamp 10 emits light according to a flashing pattern.

When the smart lamp 10 emits light according to the flashing pattern, the brightness of the light emitted by the smart lamp 10 exceeds the brightness in the normal environment by a range of a predetermined ratio (for example, 20% to 30%).

When the smart lamp 10 emits light exceeding normal brightness by the range of the predetermined ratio, the IoT device 30 may determine that sensed illuminance includes a flashing pattern and may analyze the flashing pattern based on illuminance data related to the illuminance. In addition, the IoT device 30 may be registered at the hub device 20 using the analyzed flashing pattern.

According to the present disclosure, various exemplary embodiments in which the hub device 20 registers the IoT device 30 using the flashing pattern of light emitted by the smart lamp 10 have been described. However, a waveform of a frequency may be used instead of the flashing pattern of the emitted light. For example, a frequency waveform of a ZIGBEE®, Z-WAVE®, THREAD®, WI-FI®, or BLUETOOTH® signal may be used instead of the flashing pattern.

In this case, the hub device 20 may customize a frequency waveform of an RF signal to be distinguished from a normal frequency waveform in advance, and may register the IoT device 30 using the customized frequency waveform.

For example, the hub device 20 may transmit the customized frequency waveform to a device provided with a short-distance communication module which can transmit a frequency. The device provided with the short-distance communication module may broadcast a signal according to the received frequency waveform. The IoT device 30 which receives the broadcasted signal may transmit response information on the frequency waveform to the hub device 20.

The hub device 20 which receives the response information on the frequency waveform may verify the frequency waveform and register the IoT device 30 at the hub device 20 according to the result of the verification.

Figure 17:
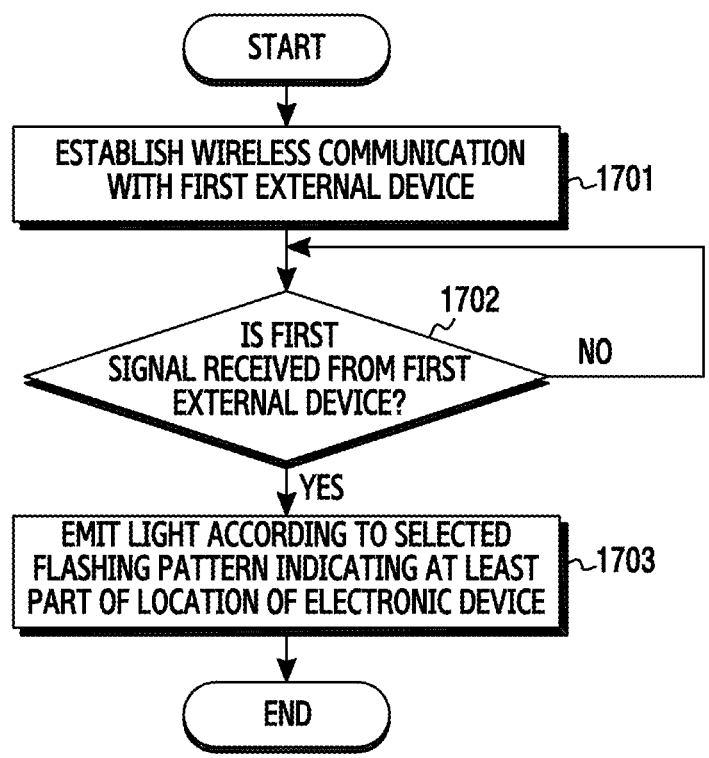
FIGS. 17 and 18 illustrate flowcharts showing an operation of an electronic device according to various exemplary embodiments of the present disclosure.
Figure 18:
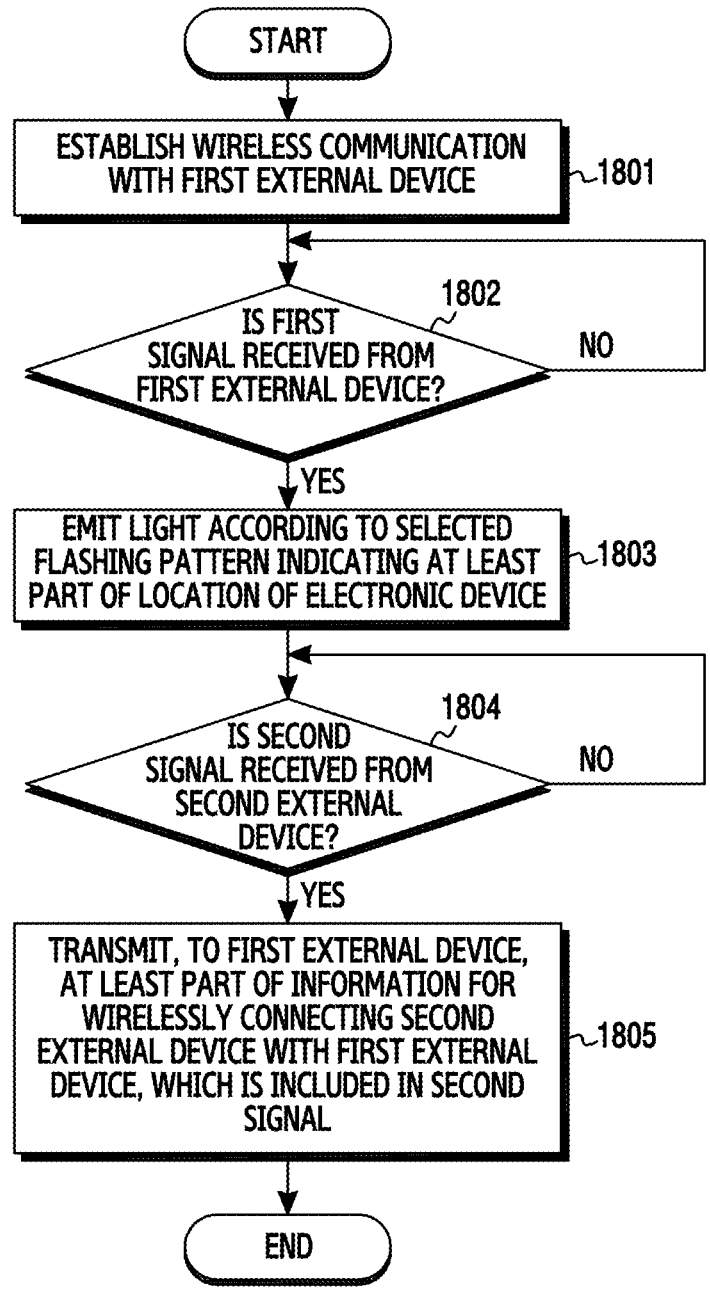
Figure 19:
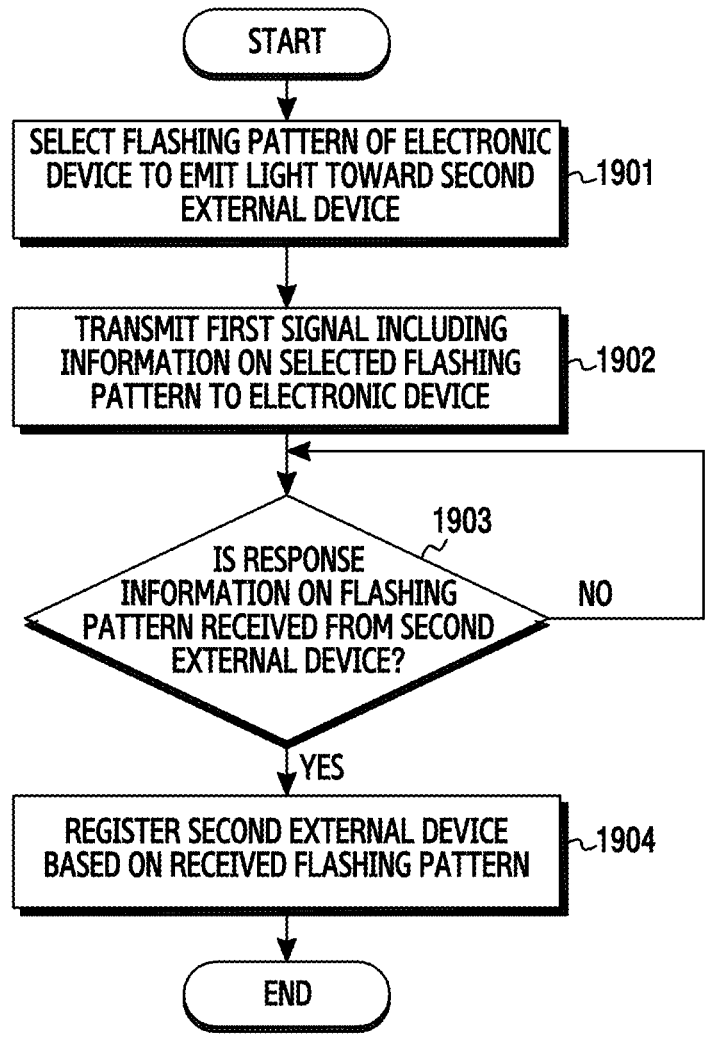
FIG. 19 illustrates a flowchart showing an operation of a first external device according to various exemplary embodiments of the present disclosure.

FIGS. 17 to 19 illustrate flowcharts showing an operation of an electronic device according to an exemplary embodiment of the present disclosure.

In FIGS. 17 to 19, the electronic device may be the smart lamp 10, a first external device may be the hub device 20, and a second external device may be the IoT device 30.

In addition, as described above, the electronic device may be the user device 40 or a part of the first external device.

According to an exemplary embodiment, in FIG. 17, the electronic device may establish wireless communication with the first external device (1701).

When the wireless communication is established, the electronic device may determine whether a first signal is received from the first external device or not (1702). In this case, the first signal may include information on a flashing pattern of light to be emitted by the electronic device. The flashing pattern may be determined according to at least one of the number of times a light emitting device emits light during a predetermined time, a flashing frequency, a color of flashing light, and brightness of flashing light.

When the first signal is received (YES of 1702), the electronic device may emit light using a light emitting device provided therein according to a selected flashing pattern which indicates at least a part of the location of the electronic device (1703).

According to another exemplary embodiment, in FIG. 18, the electronic device may establish wireless communication with the first external device (1801).

When the wireless communication is established, the electronic device may determine whether a first signal is received from the first external device (1802).

When the first signal is received (YES of 1802), the electronic device may emit light using the light emitting device provided therein according to a selected flashing pattern indicating at least a part of the location of the electronic device (1803).

When the electronic device emits light, the second external device may sense ambient illuminance of light emitted by the electronic device. The second external device may transmit a second signal to the electronic device as a result of the sensing. The second signal may include information for wirelessly connecting the second external device to the first external device. For example, the second signal may include response information on the flashing pattern based on the illuminance sensed by the second external device and relevant illuminance data.

Next, the electronic device may determine whether the second signal is received from the second external device (1804).

When the second signal is received (YES of 1804), the electronic device may transmit, to the first external device, at least a part of the information for wirelessly connecting the second external device to the first external device, which is included in the second signal (1805).

Accordingly, a communication connection may be established between the first external device and the second external device.

FIG. 19 illustrates a flowchart showing an operation of the first external device according to an exemplary embodiment of the present disclosure.

In FIG. 19, for example, the electronic device may be the smart lamp 10, the first external device may be the hub device 20, and the second external device may be the IoT device 30.

In addition, as described above, the first external device may be the user device 40 or may be the user device 40 which performs the function of the smart lamp 10.

According to an exemplary embodiment, in FIG. 19, the first external device may select a flashing pattern of the electronic device which emits light toward the second external device (1901). In this case, when the first external device is connected with a plurality of electronic devices, the first external device may select different flashing patterns for the plurality of electronic devices.

When the flashing pattern is selected, the first external device may transmit a first signal including information on the selected flashing pattern to the electronic device (1902).

In response to the first signal, the electronic device may emit light according to the received flashing pattern. In this case, the second external device may sense ambient illuminance of light emitted by the electronic device. The second external device may transmit response information on the flashing pattern to the first external device as a result of the sensing.

The first external device may determine whether the response information on the flashing pattern is received from the second external device (1903).

When the response information on the flashing pattern is received (YES of 1903), the first external device may register the second external device at the first external device based on the received flashing pattern (1904). For example, the first external device may determine whether the flashing pattern included in the response information is consistent with or similar to the flashing pattern transmitted to the electronic device. When the flashing patterns are consistent with or similar to each other as a result of the determining, the first external device may register the second external device as a device for establishing a wireless communication connection.

According to an exemplary embodiment of the present disclosure, an operating method of an electronic device which includes a light emitting device may include: establishing wireless communication with a first external device; when the wireless communication is established, receiving a first signal from the first external device; and, in response to the received first signal, emitting light using the light emitting device according to a selected flashing pattern indicating at least a part of a location of the electronic device.

According to an exemplary embodiment, the operating method may further include receiving a second signal from the second external device, and the second signal may include information for wirelessly connecting the second external device with the first external device.

According to an exemplary embodiment, the operating method may further include transmitting at least a part of the information included in the received second signal to the first external device.

According to an exemplary embodiment, the information for wirelessly connecting the second external device with the first external device may include response information on a flashing pattern based on illuminance sensed by the second external device and relevant illuminance data.

According to an exemplary embodiment, the light emitting device may include a bulb or an LED.

According to an exemplary embodiment, the first signal may include information on a flashing pattern of light to be emitted by the electronic device.

According to an exemplary embodiment, the flashing pattern indicating the at least part of the location of the electronic device may be determined according to at least one of a number of times light is emitted during a predetermined time, a flashing frequency, a color of flashing light, and brightness of flashing light.

According to an exemplary embodiment, a method for registering, by a first external device, a second external device may include: selecting a flashing pattern of an electronic device to emit light toward the second external device; transmitting a first signal including information on the selected flashing pattern to the electronic device; when the electronic device emits light according to the flashing pattern in response to the first signal, receiving response information on the flashing pattern from the second external device; and registering the second external device based on the received flashing pattern.

According to an exemplary embodiment, when the first external device is connected with a plurality of electronic devices, the selecting the flashing pattern of the electronic device may include selecting different flashing patterns for the plurality of electronic devices.

According to an exemplary embodiment, the registering the second external device based on the received flashing pattern may include determining whether the flashing pattern included in the response information is consistent with or similar to the flashing pattern transmitted to the electronic device.

According to an exemplary embodiment of the present disclosure, when a smart lamp emits light according to a flashing pattern, a plurality of IoT devices may be registered at a hub device simultaneously or almost simultaneously.

In other words, a user's operation of repeatedly registering a plurality of IoT devices may be omitted and the plurality of IoT devices can be registered at the hub device in a single registering process.

In addition, since a plurality of IoT devices are registered at a hub device using devices provided with other light emitting devices in addition to a smart lamp, user experience in using the IoT can be broadened.

The effects that can be obtained by the embodiments of the present disclosure or can be predicted therefrom are directly or implicitly disclosed in the detailed description of the embodiments of the present disclosure. For example, various effects predicted according to the embodiments of the present disclosure are disclosed in the detailed description.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a wireless communication circuit configured to establish wireless communication with an external device;
   a light emitting device configured to emit light; and
   a control circuit electrically connected with the wireless communication circuit and the light emitting device and configured to share information on a location of the electronic device with the external device,
   wherein the control circuit is configured to receive a first signal from the external device via the wireless communication circuit, and, in response to the first signal, control the light emitting device to emit light according to a flashing pattern, wherein the flashing pattern is selected from a plurality of flashing patterns, each flashing pattern corresponding to a different location, that indicates at least a part of the location of the electronic device, and
   after the light is emitted, the control circuit is configured to receive, from an internet of things (IoT) device, a second signal comprising flashing pattern information that is determined based on an illuminance sensed by the IoT device.

2. The electronic device of claim 1, wherein the second signal comprises information for wirelessly connecting the IoT device with the external device.

3. The electronic device of claim 2, wherein the control circuit is configured to control the wireless communication circuit to transmit, to the external device, at least a part of the information included in the received second signal.

4. The electronic device of claim 2, wherein the information for wirelessly connecting the IoT device with the external device comprises response information on the flashing pattern based on the illuminance sensed by the IoT device and relevant illuminance data.

5. The electronic device of claim 1, wherein the light emitting device includes a bulb or an LED.

6. The electronic device of claim 1, wherein the first signal comprises information on the flashing pattern to be emitted by the electronic device.

7. The electronic device of claim 1, wherein the flashing pattern indicating the at least the part of the location of the electronic device is determined according to at least one of a number of times light is emitted during a predetermined time, a flashing frequency, a color of flashing light, or brightness of flashing light.

8. An external device comprising:
   a wireless communication circuit configured to communicate with an electronic device and an internet of things (IoT) device; and
   a control circuit electrically connected with the wireless communication circuit and configured to register the IoT device, wherein the control circuit is configured to:
   select a flashing pattern of the electronic device to emit light toward the IoT device,
   control the wireless communication circuit to transmit a first signal comprising information indicating the selected flashing pattern to the electronic device,
   after transmitting the first signal, receive, from the electronic device via the wireless communication circuit, a response signal comprising flashing pattern information that is determined based on illuminance sensed by the IoT device, and
   based on the selected flashing pattern and the received flashing pattern information, register the IoT device.

9. The external device of claim 8, wherein, when the IoT device is connected with a plurality of electronic devices, the control circuit is configured to select different flashing patterns for the plurality of electronic devices.

10. The external device of claim 8, wherein, when the IoT device is registered, the control circuit is configured to determine whether the flashing pattern included in the response signal is consistent with or similar to the selected flashing pattern transmitted to the electronic device.

11. An operating method of an electronic device which comprises a light emitting device, the operating method comprising:
   establishing wireless communication with an external device;
   when the wireless communication is established, receiving a first signal from the external device; and in response to the received first signal, emitting light using the light emitting device according to a flashing pattern, wherein the flashing pattern is selected from a plurality of flashing patterns, each flashing pattern corresponding to a different location, indicating at least a part of a location of the electronic device, and in response to emitting light, receiving, from an internet of things (IoT) device, a second signal comprising flashing pattern information that is determined based on an illuminance sensed by the IoT device.

12. The operating method of claim 11, wherein the second signal comprises information for wirelessly connecting the IoT device with the external device.

13. The operating method of claim 12, further comprising transmitting at least a part of the information included in the received second signal to the external device.

14. The operating method of claim 12, wherein the information for wirelessly connecting the IoT device with the external device comprises response information on the flashing pattern based on the illuminance sensed by the IoT device and relevant illuminance data.

15. The operating method of claim 11, wherein the light emitting device is a bulb or an LED.

16. The operating method of claim 11, wherein the first signal comprises information on the flashing pattern to be emitted by the electronic device.

17. The operating method of claim 11, wherein the flashing pattern indicating the at least a part of the location of the electronic device is determined according to at least one of a number of times light is emitted during a predetermined time, a flashing frequency, a color of flashing light, or brightness of flashing light.

18. A method for registering, by an external device, an internet of things (IoT) device, the method comprising:
selecting a flashing pattern of an electronic device to emit light toward the IoT device;
transmitting a first signal comprising information indicating the selected flashing pattern to the electronic device;
after transmitting the first signal, receiving, from the electronic device, a response signal comprising flashing pattern information that is determined based on an illuminance sensed by the IoT device; and
registering the IoT device based on the selected flashing pattern and the received flashing pattern information.

19. The method of claim 18, wherein, when the external device is connected with a plurality of electronic devices, the selecting the flashing pattern of the electronic device comprises selecting different flashing patterns for the plurality of electronic devices.

20. The method of claim 18, wherein the registering the IoT device comprises determining whether the flashing pattern included in the response signal is consistent with or similar to the selected flashing pattern transmitted to the electronic device.

* * * * *